(12) United States Patent
Kang et al.

(10) Patent No.: US 12,514,554 B2
(45) Date of Patent: Jan. 6, 2026

(54) PRE-OPERATIVE ULTRASOUND SCANNING SYSTEM FOR PATIENT LIMB EXTENDING THROUGH A RESERVOIR

(71) Applicant: MAKO Surgical Corp., Weston, FL (US)

(72) Inventors: Hyosig Kang, Weston, FL (US); Snehal Kasodekar, Weston, FL (US); Peter L. Ebbitt, Boca Raton, FL (US)

(73) Assignee: MAKO Surgical Corp., Weston, FL (US)

( * ) Notice: Subject to any disclaimer, the term of this patent is extended or adjusted under 35 U.S.C. 154(b) by 216 days.

(21) Appl. No.: 18/220,773

(22) Filed: Jul. 11, 2023

(65) Prior Publication Data
US 2024/0016477 A1    Jan. 18, 2024

Related U.S. Application Data

(60) Provisional application No. 63/390,058, filed on Jul. 18, 2022.

(51) Int. Cl.
*A61B 8/00* (2006.01)
(52) U.S. Cl.
CPC .......... *A61B 8/4494* (2013.01); *A61B 8/4209* (2013.01); *A61B 8/4281* (2013.01)
(58) Field of Classification Search
CPC ... A61B 8/4494; A61B 8/4209; A61B 8/4281; A61B 8/15; A61B 8/40; A61B 8/483; A61B 8/5253; A61B 8/0875
See application file for complete search history.

(56) References Cited

U.S. PATENT DOCUMENTS

| | | | | |
|---|---|---|---|---|
| 5,305,752 A | * | 4/1994 | Spivey | A61B 8/463 600/448 |
| 5,806,521 A | * | 9/1998 | Morimoto | A61B 8/463 600/447 |

(Continued)

FOREIGN PATENT DOCUMENTS

| | | | | |
|---|---|---|---|---|
| CN | 105342639 A | * | 2/2016 | A61B 8/40 |
| CN | 111983029 A | * | 11/2020 | |

(Continued)

OTHER PUBLICATIONS

He, PhD, Ping et al., "Test of a Vertical Scan Mode in 3-D Imaging of Residual Limbs Using Ultrasound", Department of Biomedical and Human Factors Engineering, Wright State University, Dayton, Ohio, https://www.rehab.research.va.gov/jour/99/36/2/he.htm, Journal of Rehabilitation Research and Development, vol. 36, No. 2, Apr. 1999, 10 pages.

(Continued)

*Primary Examiner* — Serkan Akar
*Assistant Examiner* — Jason P Gross
(74) *Attorney, Agent, or Firm* — Howard & Howard Attorneys PLLC

(57) ABSTRACT

An ultrasound scanning system adapted for scanning a joint of a limb. The scanning system includes a reservoir with one or more walls that define a reservoir interior to hold a fluid and receive the limb therein. A transducer is disposed within the reservoir interior and has ultrasound emitters and receivers. The transducer surrounds the joint within the reservoir interior. A transducer positioning system is disposed outside of the reservoir and includes an actuator to move a transducer carriage along a guide. The transducer carriage couples to the transducer across the wall of the reservoir using non-contact coupling. The transducer positioning system moves the transducer carriage along the guide to move the transducer within the reservoir interior. In some imple- (Continued)

mentations, the reservoir includes a distal closure which the limb can extend beyond. The distal closure fits around the limb to create a seal between the limb and the distal closure.

23 Claims, 11 Drawing Sheets

(56) References Cited

U.S. PATENT DOCUMENTS

| | | | |
|---|---|---|---|
| 5,810,008 | A | 9/1998 | Dekel et al. |
| 6,013,031 | A | 1/2000 | Mendlein et al. |
| 6,106,464 | A | 8/2000 | Bass et al. |
| 6,122,538 | A | 9/2000 | Sliwa, Jr. et al. |
| 6,203,497 | B1 | 3/2001 | Dekel et al. |
| 7,949,386 | B2 | 5/2011 | Buly et al. |
| 8,366,740 | B2 | 2/2013 | McEwen et al. |
| 8,444,564 | B2 | 5/2013 | Mahfouz et al. |
| 8,540,638 | B2 | 9/2013 | Gourevitch |
| 8,771,188 | B2 | 7/2014 | Schers et al. |
| 9,119,655 | B2 | 9/2015 | Bowling et al. |
| 9,199,096 | B2 | 12/2015 | Lewis, Jr. |
| 9,642,572 | B2 | 5/2017 | Mahfouz et al. |
| 9,707,043 | B2 | 7/2017 | Bozung |
| 9,895,135 | B2 | 2/2018 | Pelissier et al. |
| 10,123,770 | B2 * | 11/2018 | Szpak ............... A61B 8/0825 |
| 10,251,622 | B2 | 4/2019 | Tesic et al. |
| 10,335,116 | B2 | 7/2019 | Boctor et al. |
| 10,517,568 | B2 | 12/2019 | Wasielewski |
| 10,561,394 | B2 | 2/2020 | Wang et al. |
| 10,653,389 | B2 | 5/2020 | Kiyan et al. |
| 2003/0195420 | A1 | 10/2003 | Mendlein et al. |
| 2004/0064046 | A1 | 4/2004 | Shehada |
| 2005/0143638 | A1 * | 6/2005 | Johnson ............... A61B 5/415 600/407 |
| 2009/0018445 | A1 | 1/2009 | Schers et al. |
| 2010/0198063 | A1 | 8/2010 | Huber et al. |
| 2012/0029358 | A1 | 2/2012 | Lin |
| 2013/0041260 | A1 | 2/2013 | Schmidt et al. |
| 2015/0051490 | A1 * | 2/2015 | McKinnon ............... A61B 8/14 600/443 |
| 2015/0297190 | A1 | 10/2015 | Selker |
| 2015/0374334 | A1 | 12/2015 | Klock et al. |
| 2016/0242736 | A1 | 8/2016 | Freiburg et al. |
| 2017/0100092 | A1 * | 4/2017 | Kruse ............... G16H 50/30 |
| 2017/0232277 | A1 | 8/2017 | Hall et al. |
| 2019/0151192 | A1 | 5/2019 | Yamashita |
| 2020/0005552 | A1 | 1/2020 | Furst |
| 2020/0060735 | A1 | 2/2020 | Chang et al. |
| 2020/0397402 | A1 * | 12/2020 | Richardson ............ A61B 8/5215 |
| 2021/0145608 | A1 * | 5/2021 | Herr ................... A61B 8/0825 |
| 2021/0215642 | A1 * | 7/2021 | Fincke ................ G01N 33/12 |
| 2021/0290313 | A1 | 9/2021 | Cerda-Carvajal et al. |
| 2021/0378631 | A1 | 12/2021 | Mahfouz et al. |
| 2022/0054340 | A1 * | 2/2022 | Oestergaard ........... A61H 3/008 |
| 2022/0071598 | A1 * | 3/2022 | Hwang ................. A61B 8/483 |
| 2022/0395253 | A1 * | 12/2022 | Ferrara ................ A61B 8/15 |

FOREIGN PATENT DOCUMENTS

| | | | |
|---|---|---|---|
| CN | 115105396 A | * 9/2022 | |
| DE | 202016000335 U1 | * 5/2016 | ............... A61B 8/13 |
| EP | 2358276 B1 | 9/2013 | |
| WO | 2011134083 A1 | 11/2011 | |
| WO | 2021011646 A2 | 1/2021 | |

OTHER PUBLICATIONS

Partial International Search Report for Application No. PCT/US2023/027209 dated Nov. 6, 2023, 2 pages.

* cited by examiner

PRE-OPERATIVE ULTRASOUND SCANNING SYSTEM FOR PATIENT LIMB EXTENDING THROUGH A RESERVOIR

CROSS-REFERENCE TO RELATED APPLICATIONS

The subject application claims priority to and all the benefits of U.S. Provisional Patent App. No. 63/390,058, filed Jul. 18, 2022, the entire contents of which is hereby incorporated by reference.

TECHNICAL FIELD

The present disclosure relates to an ultrasound scanning system and methods for using the same.

BACKGROUND

For surgical planning purposes, orthopedic surgery often relies on pre-operative imaging data of the diseased region of the anatomy, such as a knee joint. Common pre-operative imaging modalities for orthopedic surgery include X-ray and CT imaging. However, X-ray imaging can expose the patient to potentially harmful radiation. CT imaging also has exposure to magnetic fields. CT imaging also requires long imaging times and is costly to purchase and maintain. Furthermore, many patients are unwilling to enter CT image scanners due to claustrophobia.

Ultrasound imaging is an alternative pre-operative imaging modality for orthopedic surgery. Ultrasound imaging does not produce the radiation or exposure of X-ray or CT imaging. However, conventional ultrasound imaging systems have several shortcomings. One type of ultrasound imaging uses a hand-held ultrasound probe which is manually moved by a technician. However, hand-held ultrasound probes cannot rapidly capture a complete 360-degree scan of the joint. For example, for a knee joint, the hand-held probe is usually moved along an upper or side surface of the joint. To scan behind the knee, the patient is required to lay prone on the examination table. As such, the scans obtained from hand-held probes are acquired at various times and when the knee is in different poses. Furthermore, hand-held probe scans have limited resolution and the quality of the scan is dependent on the skill of the technician. For these reasons, scans from hand-held ultrasound probes are not well-suited for pre-operative planning for orthopedic surgery.

SUMMARY

This Summary introduces a selection of concepts in a simplified form that are further described below in the Detailed Description below. This Summary is not intended to limit the scope of the claimed subject matter nor identify key features or essential features of the claimed subject matter.

According to a first aspect, an ultrasound scanning system is provided which is adapted for scanning a joint of a limb, the ultrasound scanning system comprising: a reservoir comprising one or more walls that define a reservoir interior, the reservoir being configured to hold a fluid and receive the limb within the reservoir interior; a transducer disposed within the reservoir interior and comprising an array of ultrasound emitters and an array of ultrasound receivers, the transducer being configured to surround the joint within the reservoir interior; and a transducer positioning system disposed outside of the reservoir and comprising an actuator configured to move a transducer carriage along a guide, the transducer carriage is configured to couple to the transducer across the one or more walls of the reservoir using non-contact coupling, and the transducer positioning system is configured to move the transducer carriage along the guide to move the transducer within the reservoir interior.

According to a second aspect, an ultrasound scanning system is provided which is adapted for scanning a joint of a limb, the ultrasound scanning system comprising: a reservoir defining a reservoir interior and being configured to hold a fluid and receive the limb within the reservoir interior; a transducer disposed within the reservoir interior and comprising an array of ultrasound emitters and an array of ultrasound receivers, the transducer configured to surround the joint within the reservoir interior; and wherein the reservoir comprises one or more walls extending between a proximal reservoir opening and a distal closure, wherein the reservoir enables the limb to pass through the proximal reservoir opening and to extend beyond the distal closure, and wherein the distal closure is configured to fit around the limb to create a seal between the limb and the distal closure to prevent leakage of the fluid.

According to a third aspect, a method is provided of using an ultrasound scanning system that is adapted for scanning a joint of a limb, the ultrasound scanning system comprising a reservoir including one or more walls extending between a proximal reservoir opening and a distal reservoir opening, a distal closure configured to close the distal reservoir opening, and a reservoir interior defined by the one or more walls and the distal closure, a transducer disposed within the reservoir interior and comprising an array of ultrasound emitters and an array of ultrasound receivers, and a transducer positioning system configured to move the transducer within the reservoir interior, the method comprising: passing the limb through the proximal reservoir opening; passing the limb through the distal closure such that the limb extends beyond the distal closure; fitting the distal closure around the limb for creating a seal between the distal closure and the limb; filling the reservoir with a fluid; activating the transducer; and controlling the transducer positioning system to move the transducer within the reservoir interior to scan the joint.

According to a fourth aspect, an ultrasound scanning system is provided which is adapted for scanning a joint of a limb, the ultrasound scanning system comprising: a reservoir comprising one or more walls that define a reservoir interior, the reservoir being configured to hold a fluid and receive the limb within the reservoir interior; a transducer disposed within the reservoir interior and comprising an array of ultrasound emitters and an array of ultrasound receivers; and a reservoir positioning system comprising an actuator configured to move a reservoir carriage along a guide, the reservoir carriage being coupled to the reservoir, and the reservoir positioning system being configured to move the reservoir carriage along the guide to adjust a position of the reservoir.

According to a fifth aspect, an ultrasound scanning system is provided which is adapted for scanning a joint of a limb, the ultrasound scanning system comprising: a reservoir comprising one or more walls that define a reservoir interior, the reservoir being configured to hold a fluid and receive the limb within the reservoir interior, and wherein the reservoir has a proximal reservoir opening and a distal closure, the proximal reservoir opening being located above the distal closure such that the distal closure supports a weight of the fluid within the reservoir interior, and the reservoir enables the limb to pass through the proximal reservoir opening to enter the reservoir interior; and a transducer disposed within the reservoir interior and comprising an array of ultrasound emitters and an array of ultrasound receivers; and wherein the one or more walls of the reservoir comprise a flexible material and the reservoir is configured to be moved to, and between, a collapsed state wherein the proximal reservoir opening is spaced apart from the distal closure by a first distance, and an extended state wherein the proximal reservoir opening is spaced apart from the distal closure by a second distance that is greater than the first distance.

According to a sixth aspect, an ultrasound scanning system is provided which is adapted for scanning a joint of a limb of a patient, the ultrasound scanning system comprising: a sleeve container comprising one or more walls that define a sealed volume and a central channel, the sealed volume being configured to hold a fluid therein, the central channel extending through the sealed volume and being open and sealed from exposure to the fluid, the central channel being configured to receive the limb therethrough such that the sleeve container can be worn by the patient; a transducer disposed within the sealed volume and comprising an array of ultrasound emitters and an array of ultrasound receivers, the transducer being configured to surround the joint; and a transducer positioning system disposed outside of the sleeve container and comprising an actuator configured to move a transducer carriage along a guide, the transducer carriage is configured to couple to the transducer across the one or more walls of the sleeve container using non-contact coupling, and the transducer positioning system is configured to move the transducer carriage along the guide to move the transducer within the sealed volume of the sleeve container.

According to a seventh aspect, a method is provided of generating a 3D model of a joint of a limb using an ultrasound scanning system, the ultrasound scanning system comprising a reservoir defining a reservoir interior and being configured to hold a fluid and receive the limb within the reservoir interior, a ring transducer disposed within the reservoir interior and comprising an array of ultrasound emitters and an array of ultrasound receivers, the ring transducer being configured to surround the joint within the reservoir interior, and a control system coupled to the ring transducer, the method comprising the control system performing the following steps: controlling the ring transducer to produce a first scan the joint at a first location; controlling the ring transducer to produce a second scan the joint at a second location after completion of the first scan; comparing the first and second scans to detect a misalignment between the first and second scans, the misalignment being indicative of a pose of the limb changing after the first scan; based on the detected misalignment, determining one or more modifications to apply to the second scan; applying the one or more modifications to the second scan for correcting the misalignment; and stitching together the first and second scans after correcting the misalignment.

According to an eighth aspect, an ultrasound scanning system is provided which is adapted for scanning a joint of a limb, the ultrasound scanning system comprising: a reservoir defining a reservoir interior and being configured to hold a fluid and receive the limb within the reservoir interior; a transducer disposed within the reservoir interior and comprising an array of ultrasound emitters and an array of ultrasound receivers, the transducer configured to surround the joint within the reservoir interior; a sensor disposed within the reservoir interior and being configured to sense a property of the fluid; a thermal element disposed within the reservoir interior and being configured to heat the fluid; and a control system coupled to the transducer, the sensor, and the thermal element, the control system being configured to: obtain an acoustic impedance value related to tissue of the limb; acquire measurements from the sensor; determine an acoustic impedance value of the fluid based on the measurements from the sensor; and control the thermal element to heat the fluid until the control system determines that the acoustic impedance value related to the tissue matches the acoustic impedance value of the fluid.

Any of the above aspects can be utilized individually, or in combination.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION

Figure 1:
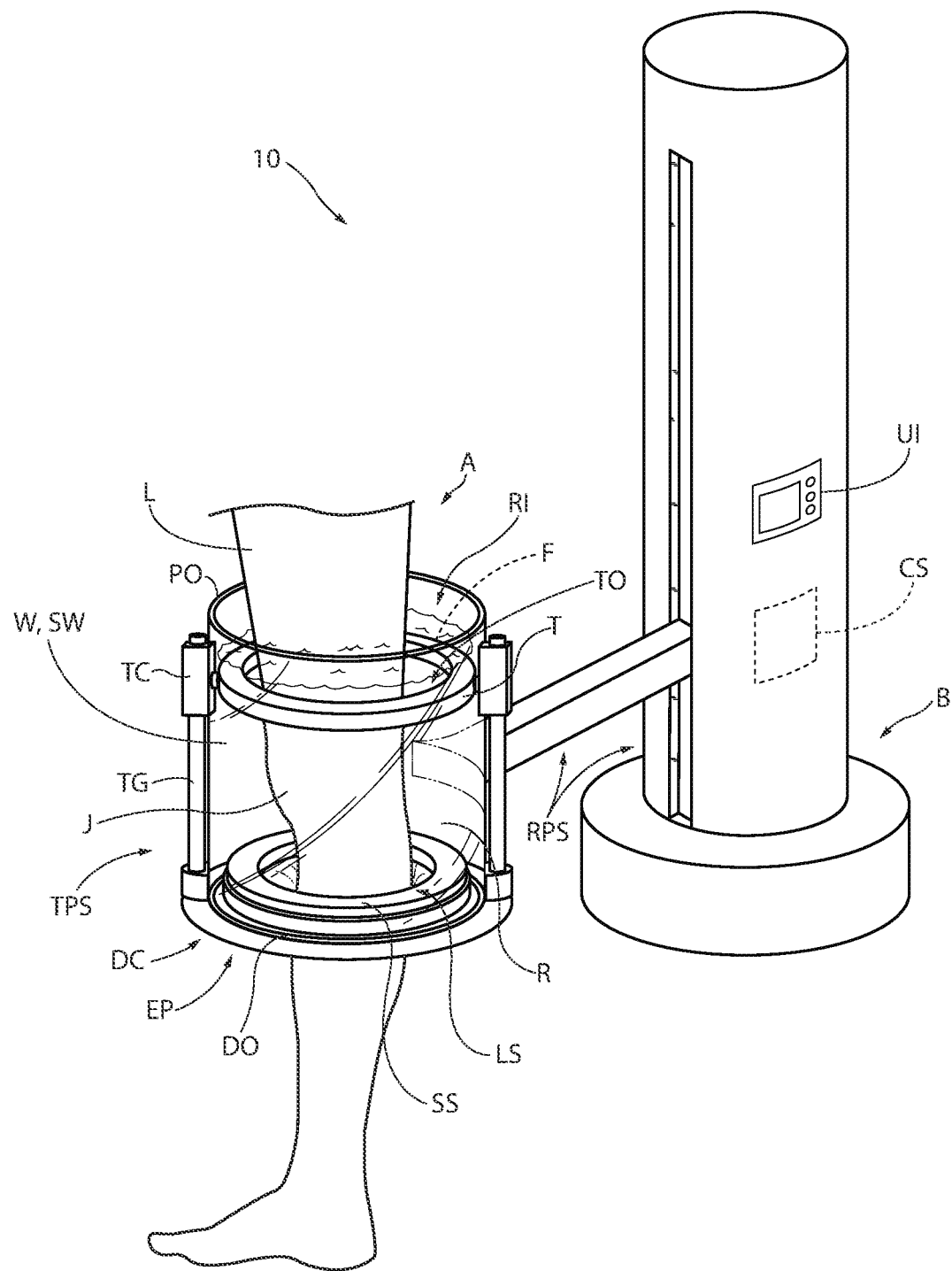
FIG. 1 is a perspective view of an ultrasound scanning system, according to one implementation.

Implementations of an ultrasound scanning system 10 are described herein that provides several advantages over existing pre-operative imaging systems. The advantages include, but are not limited to, the ultrasound scanning system 10 being: (1) cost effective and not requiring a high investment or maintenance cost; (2) easy to operate and adapted for in-office use; (3) able to scan the anatomy without exposure of radiation or high magnetic fields; (4) able to scan the anatomy without reliance on the skill of a technician; (5) able to provide, in real-time, a 360 degree scan of the anatomy, including continuous contours of the anatomy; (6) able to provide high-resolution scans that are suitable for pre-operative surgical planning and 3D model generation of the anatomy; (7) able to scan the anatomy in one position and without requiring the patient to repeatedly change positions; (8) able to quickly scan the anatomy without extended scanning time; (9) adjustable in pose (position and/or orientation) to accommodate any sized patient limb; (10) able to allow the limb to extend through the reservoir thereby minimizing system footprint size, increase portability of the scanning system, decrease cost of material and fluid required; (11) able to allow the limb to extend through the reservoir to provide the patient with a stable and dry standing surface; (12) able to close the reservoir bottom after the patient limb extends through the reservoir to provide additionally safety for the patient; (13) able to seal the distal closure to the limb to prevent fluid from leaking from the reservoir, reduce the footprint of the reservoir, increase portability of the scanning system, and reduce an amount of fluid used; (14) able to move the scanning transducer from outside of the reservoir to avoid interference with the scanning medium or scan, avoid contamination of the fluid, extend the life of the moving components, avoid exposing the limb to more moveable components than necessary, avoid having electronic components within the fluid; (15) able to move the scanning transducer from outside of the reservoir using a non-contact coupling to avoid forming a slot in the reservoir which could cause leakage or component failure; (16) able to move portions of the reservoir, or the entire reservoir, using a positioning system for the convenience of the patient, safety of the patient, and/or quick setup before scanning; (17) able to provide generate a 3D contours from the scans that can be stitched together to form a 3D model of the anatomy; (18) able to compensate for limb motion occurring between scans by stitching together misaligned scans; (19) able to adjust a gain of the transducer based on the density of the fluid; (20) able to modify the fluid to achieve acoustic impedance matching between the limb tissue and the fluid; and (21) able to have a collapsible reservoir that can reduce the size and cost of the system.

The ultrasound scanning system 10, and methods of using the same, will now be described in detail. Other advantages will be understood from the following description and the Figures.

A. Types of Anatomy

With reference to FIG. 1, the ultrasound scanning system 10 is adapted for scanning an anatomy (A) of a patient. The anatomy (A) can be a limb (L), such as a lower limb (leg) or an upper limb (arm). The limb (L) of the patient can be scanned to obtain image data related to any anatomical feature of the limb (L). In the example shown, the anatomical feature is a joint (J) related to the limb (L), and more specifically, a knee joint of a leg. Alternatively, when the limb (L) is a leg, the joint (J) can be a hip joint, an ankle joint, a tarsometatarsal joint, a metatarsophalangeal joint, or the like. When the limb (L) is an arm, the joint (J) can be a shoulder joint, elbow joint, wrist joint, sternoclavicular joint, radioulnar joint, radiocarpal joint, midcarpal joint, metacar-pophalangeal joint, interphalangeal joint, carpometacarpal joint (finger), or the like. Additionally, or alternatively, the anatomical feature can be a ligament related to the limb (L). When the limb (L) is a leg, the ligament can be an anterior cruciate ligament (ACL), posterior cruciate ligament (PCL), medial collateral ligament (MCL), lateral collateral ligament (LCL), and the like. The anatomical feature scanned can also be other types of tissue and/or cartilage such as, a patella, articular cartilage, meniscus, etc. In other examples, the scanning system 10 need not be limited to scanning limbs but can be adapted to scan other anatomy (A) such as the pelvic region, a shoulder region, foot region, wrist region, spinal region, or the like. The tissues that can be scanned can include skin, subcutaneous fat, muscle, tendons, bursa, cartilage, and bone.

As described, the ultrasound scanning system 10 is adapted to scan several types of anatomy (A). However, for simplicity in description, the anatomy (A) described below will be a limb (L), and more specifically, the leg of the patient.

B. Reservoir

With continued reference to FIG. 1, the ultrasound scanning system 10 comprises a reservoir (R). The reservoir (R) includes one or more surfaces or walls (W) that define a reservoir interior (RI). The reservoir (R) is configured to hold a fluid (F) and receive the limb (L) within the reservoir interior (RI). The fluid (F) is used to provide a scanning medium for propagation of ultrasound waves. The fluid (F) can be any suitable acoustic coupling medium, including, but not limited to: water, distilled water, blood-mimicking fluid (BMF), water-glycerol mixtures, and the like.

The reservoir (R) can have a cylindrical shape, as shown. Alternatively, the reservoir (R) can have any other suitable type of shape that defines an interior volume, such as a rectangular prism, triangular prism, N-faced prism, cone, sphere or any irregular and/or partial versions of these shapes, including any combination of different shapes merged together. The number of walls (W) of the reservoir (R) will depend on the shape of the reservoir (R). When the reservoir (R) is a cylinder, as shown, the reservoir (R) has one side wall (SW) that is formed by circular side wall (SW) of the cylinder. Any number of side walls (SW) are contemplated. In one example, the side wall (SW) has a thickness of ⅜ inch to withstand the pressure of the fluid (F). However, any thickness is possible that enables the scanning system 10 to function as described.

The reservoir (R) defines or includes a bottom wall or wall assembly, which is described herein as the "distal closure" (DC), which will be described in greater detail in the next section. Together, the side wall(s) (SW) and distal closure (DC) define the reservoir interior (RI), which is the interior volume within the reservoir (R) into which the limb (L) and fluid (F) are received. The distal closure (DC) supports the weight of the fluid (F) within the reservoir interior (RI).

Figure 4:
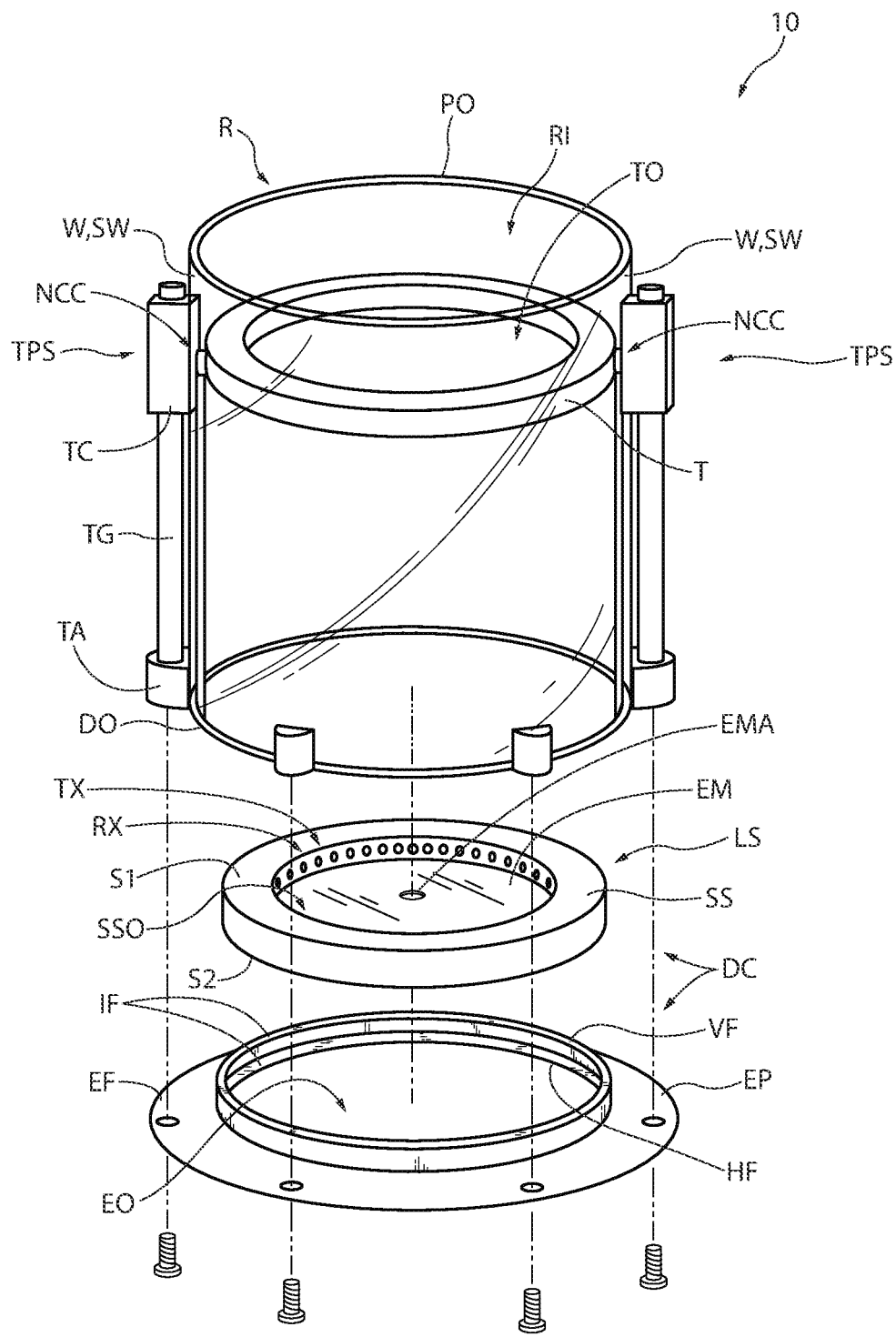
FIG. 4 is a partially exploded view illustrating separation between the reservoir and a distal closure assembly that connects to the reservoir, according to one implementation.

A proximal reservoir opening (PO) is located above the distal closure (DC). The limb (L) can pass through the proximal reservoir opening (PO) to enter the reservoir interior (RI). The fluid (F) can also enter and/or exit the reservoir (R) through the proximal reservoir opening (PO), or optionally, through a tube that is within the reservoir interior (RI). In some instances, as is best shown in FIG. 4, the reservoir (R) may include a distal reservoir opening (DO) that is opposite the proximal reservoir opening (PO). The distal reservoir opening (DO) may be configured to be closed by the distal closure (DC). In other words, the distal closure (DC) can removably attach to the distal reservoir opening (DO). Alternatively, the distal closure (DC) may be permanently or semi-permanently retained to the reservoir (R) such that no distal reservoir opening (DO) is accessible or formed.

Figure 8:
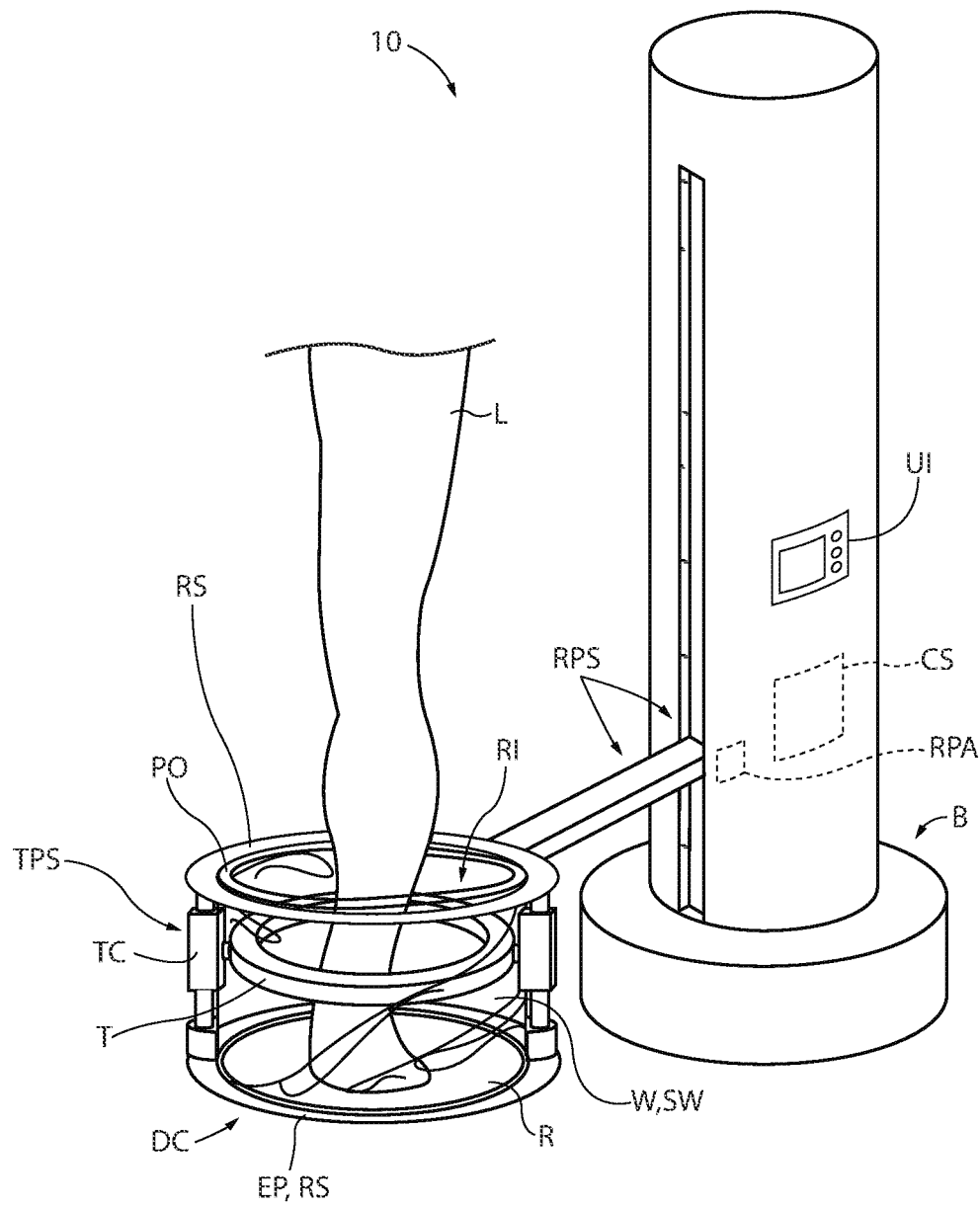
FIG. 8 illustrates the ultrasound scanning system including the reservoir positioning system having the reservoir positioned in a collapsed state to enable the limb to step therein, according to one implementation wherein the reservoir has a flexible body.
Figure 9:
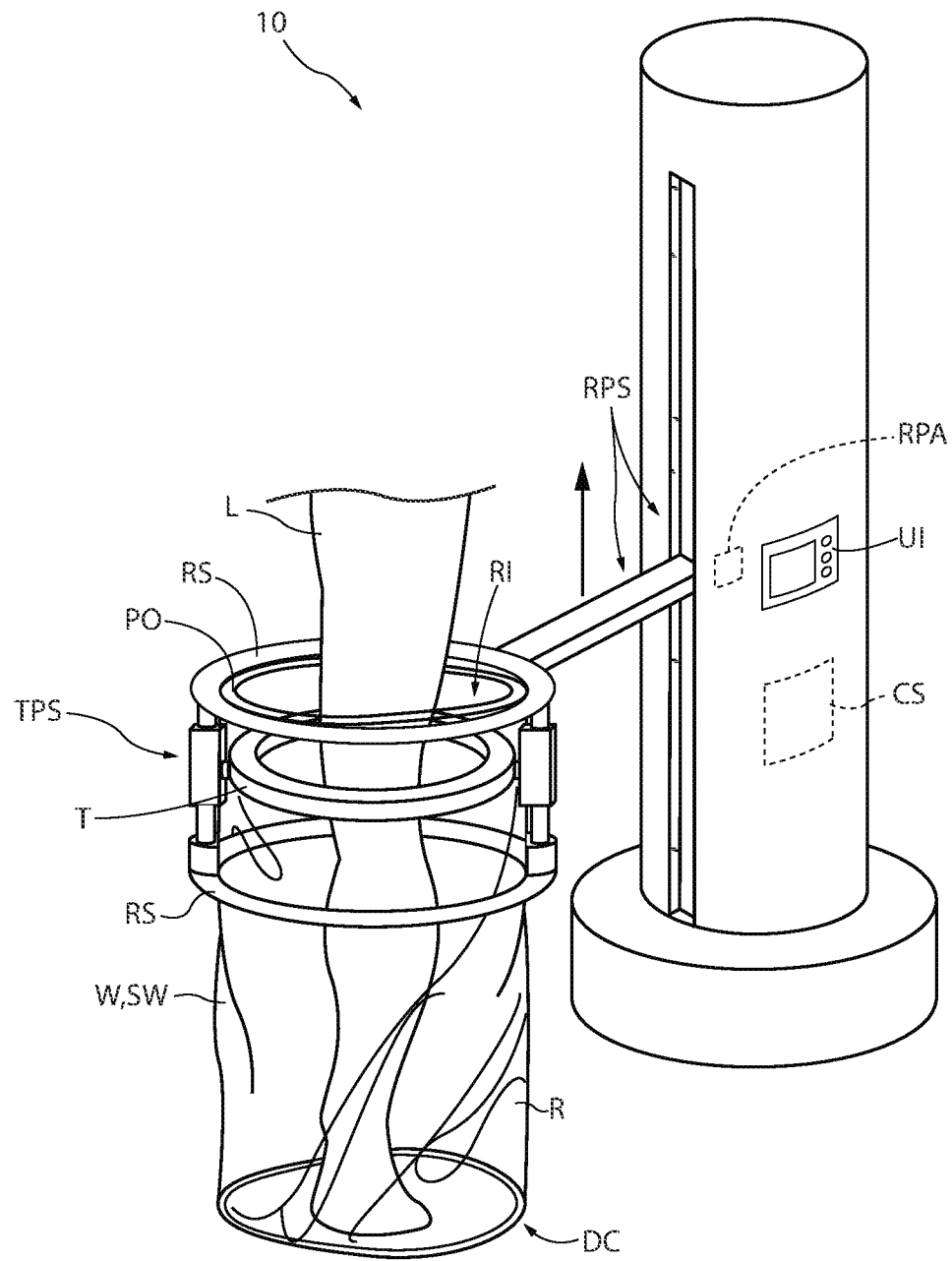
FIG. 9 illustrates the ultrasound scanning system of FIG. 8 but wherein the reservoir positioning system moves the reservoir to an expanded state to enable the joint of the limb to be encompassed within the reservoir interior.

In one instance, such as shown in FIG. 1, the reservoir (R) has a rigid body. For instance, the side wall(s) (SW) and distal closure (DC) are both rigid components such that shape of the reservoir (R) does not change. In another example, as shown in FIGS. 8 and 9, the reservoir (R) has a flexible body. For instance, the side wall(s) (SW) and distal closure (DC) can be partially or fully formed of flexible or elastic components such that shape of the reservoir (R) can change. The flexible material is configured to withstand pressure from the fluid and patient within the reservoir interior (RI) while also allowing the reservoir (R) to easily collapse or expand in size. In yet another example, some portions of the reservoir (R) can be rigid while other portions are flexible. For example, the side wall(s) (SW) can be a rigid material while portions of the distal closure (DC) can be flexible.

In the example shown in FIG. 1, the reservoir (R) is configured to moved, e.g., lifted off the floor surface, using a reservoir positioning system (RPS), which will be described below. In other examples, however, the reservoir (R) could rest on a support surface, e.g., floor. In yet another example, the reservoir (R) could be versatile to provide both options, i.e., the reservoir (R) could either rest on the floor or be coupled to the reservoir positioning system (RPS), depending on the user preference.

The terms used herein such as 'side,' 'bottom,' 'proximal,' 'distal,' etc. are used relative to the embodiment shown in the figures. However, these terms are not intended to limit the possible orientations of the reservoir (R) and other components of the scanning system 10. For example, it is contemplated that the limb (L) could enter the reservoir (R) from the bottom, for example, when scanning an arm. In such scenarios, the reservoir (R) may be oriented upside-down (e.g., above the patient). The limb (L) could also enter the reservoir (R) from the side, for example, when scanning a leg while the patient lays on a table. Here, the reservoir could be positioned sideways (e.g., parallel to the support surface of a patient support table). Hence, the relative terms such as 'side,' 'bottom,' 'proximal,' 'distal' can be modified to describe different parts depending on the orientation of the reservoir (R) or any components of the scanning system 10.

C. Distal Closure

As described above, the reservoir (R) includes the distal closure (DC), which in the examples shown, is located at the bottom of the reservoir (R) and supports the weight of the fluid (F) within the reservoir (R). However, in some implementations, the distal closure (DC) comprises an assembly of components that enable a unique way in which the reservoir (R) can be positioned relative to the limb (L). That is, the limb (L), when positioned within the reservoir (R), can extend beyond the distal closure (DC), as shown in FIG. 1. The distal closure (DC) is configured to fit around the exterior surface of the limb (L) (e.g., the skin surface) to create a seal between the limb (L) and the distal closure (DC), as also shown in FIG. 4.

Figure 5:
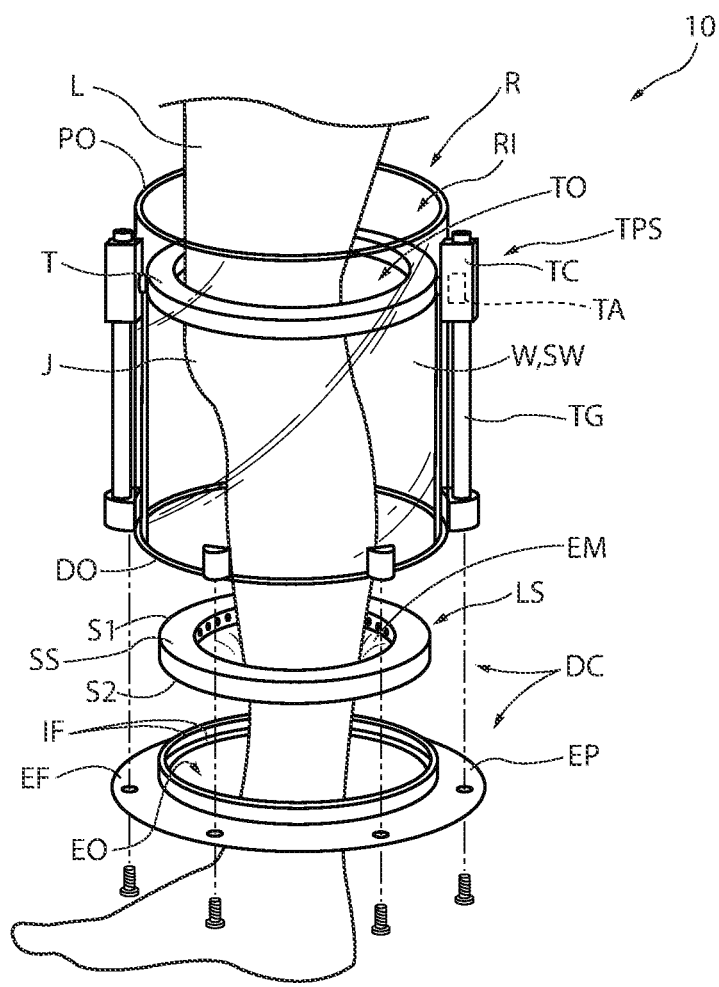
FIG. 5 illustrates a limb of a patient extending through the reservoir, the transducer, and the distal closure assembly, according to one implementation.

As best shown in FIGS. 4 and 5, the components of the distal closure (DC) include an end plate (EP) and a limb seal (LS). The end plate (EP) is configured to removably attach to the reservoir (R) at the distal reservoir opening (DO). For example, the end plate (EP) can be snapped to the hinges on the reservoir (R) or coupled to the reservoir (R) using any suitable fastener or latching system. In the example shown in FIGS. 4 and 5, the end plate (EP) is bolted to receivers that are located at the walls (W) of the reservoir (R). Alternatively, the end plate (EP) may be permanently or semi-permanently fixed to the reservoir (R) at the distal reservoir opening (DO).

In the examples shown throughout, the end plate (EP) has a ring-shaped configuration sized to the cylindrical reservoir (R). However, the end plate (EP) may have other geometry sized to fit any geometry of the reservoir (R). As shown in FIG. 4, the end plate (EP) includes a body that has an interior flange (IF) that is configured to couple to, and/or fit within, the distal reservoir opening (DO). The interior flange (IF) can include a vertical flange portion (VF) and a horizontal flange portion (HF). In one example, the vertical flange portion (VF) abuts the contour of the distal reservoir opening (DO). In another example, the vertical flange portion (VF) enters the distal reservoir opening (DO). A seal can be disposed along the interior flange (IF), and more specifically, along either the vertical flange portion (VF) and/or the horizontal flange portion (HF). The seal can interface with the distal reservoir opening (DO) to prevent the fluid (F) from leaking between the end plate (EP) and the distal reservoir opening (DO). In one example, the seal is a double O-ring seal. The fastening mechanism which secures the end plate (EP) to the reservoir (R) can apply force to the seal when these components are secured.

The body of the end plate (EP) also defines an exterior flange (EF) that is configured to extend outside of the reservoir (R). The exterior flange (EF) extends horizontally and opposite the horizontal flange portion (HF). The exterior flange (EF) can support components of the scanning system 10 and can comprise fastening features, such as apertures for bolts, to enable the end plate (EP) to be secured to the reservoir (R). The end plate (EP) has an end plate opening (EO) configured to enable the limb (L) to pass therethrough. The end plate opening (EO) is defined inside the vertical flange portion (VF) and may be circular or any other shape. The end plate (EP) may be formed of a rigid material to enable the end plate (EP) to withstand the weight of the fluid (F) or to support other components of the scanning system 10, including components of the transducer positioning system (TPS) and/or reservoir positioning system (RPS), which will be described below.

With continued reference to FIGS. 4 and 5, the distal closure (DC) also includes the limb seal (LS). The limb seal (S) can be used with the end plate (EP) or can be integrally connected to, or part of, the end plate (EP). As shown in FIG. 1, the limb seal (LS) is configured to be disposed within the reservoir interior (RI). The limb seal (LS) can be an assembly that includes a seal support (SS) that forms a frame and defines a seal support opening (SSO) configured to enable the limb (L) to pass therethrough. In the example shown in FIGS. 4 and 5, the seal support (SS) has a ring-shaped configuration sized to the cylindrical reservoir (R). However, the seal support (SS) may have other geometry sized to fit any geometry of the reservoir (R).

As shown in FIG. 4, an elastic material (EM) or membrane is coupled to the seal support (SS) and extends across the seal support opening (SSO). As shown in FIG. 5, the elastic material (EM) is configured to elastically fit around the limb (L) to create a seal between the limb (L) and the elastic material (EM). In one implementation, the elastic material (EM) defines an aperture (EMA) through which the limb (L) is passed through. The aperture (EMA) may be sized to be smaller than the limb (L) to enable the limb (L) the stretch the aperture (EMA) so that the elastic material (EM) stretches around the limb (L) to create compressive force to form the seal. In some cases, more than one limb seal (LS) or elastic material (EM) could be provided with each one having a different sized aperture (EMA) to accommodate different sized limbs. A technician can choose the appropriately sized limb seal (LS) or elastic material (EM). In such cases, a common seal support (SS) could be adapted to enable attachment of elastic materials (EM) having different sized apertures (EMA). In another example, the elastic material (EM) may initially be a continuous surface that extends across the seal support opening (SSO) without any aperture (EMA). In this example, the limb (L) may be forced through the elastic material (EM) to create the aperture (EMA) in the elastic material (EM). The elastic material (EM) may include region near the center of the seal support opening (SSO) that is designed to be more elastic or pliable than outer regions of the elastic material (EM). This center region be implemented by reduced thickness of the elastic material (EM) or by using a more elastic material. The pliability of this region may facilitate the distal portion of the limb (e.g., foot or hand) to puncture the elastic material (EM) to create the aperture (EMA). In yet another example, a manual tightener may be coupled to the aperture (EMA) of the elastic material (EM) to reduce the aperture size to create the seal. For example, a draw string may be coupled the aperture (EMA) and may be pulled to tighten the aperture (EMA).

The elastic material (EM) may comprise any suitable types of material to support the weight of the fluid (F) and create the seal. Example materials include, rubberized silicone, synthetic rubber, liquid silicone rubber (LSR), elastomers, silicone elastomer, compression molded silicone rubber (CMSR), thermoplastic polymer, thermoplastic elastomer, urethane, or the like. The thickness of the elastic material (EM) may be in the range of 0.5 mm to 2 mm. The elastic material (EM) may be transparent, translucent, or opaque.

Figure 2:
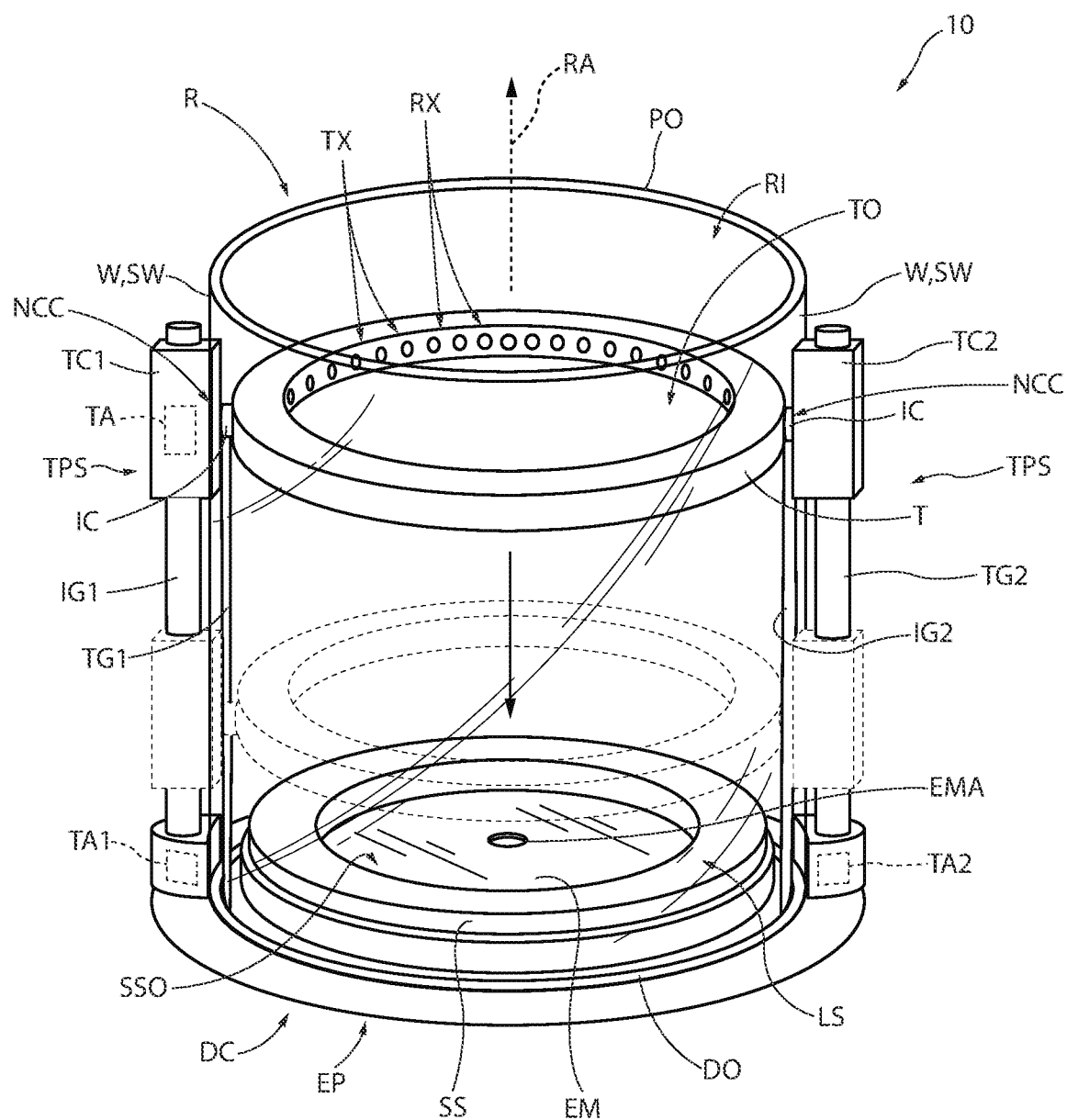
FIG. 2 illustrates a transducer within a reservoir of the ultrasound scanning system wherein an exterior-located transducer positioning system couples to the transducer using non-contact coupling to move the transducer between a first position and a second position, according to one implementation.

As can be seen in FIGS. 2 and 4, the interior flange (IF) of the end plate (EP), and more specifically, the horizontal flange portion (HF), is configured to support the seal support (SS). That is, the seal support (SS) is configured to rest on the interior flange (IF) of the end plate (EP). The interior flange (IF) of the end plate (EP) can define a groove that is sized to receive the seal support (SS) therein, such that the end plate (EP) encircles the seal support (SS). The end plate (EP) can support the seal support (SS) within the reservoir interior (RI) and/or exterior to the reservoir (R). The seal support (SS) can couple to the end plate (EP) according to various techniques. In one example, the seal support (SS) is configured to magnetically couple to the end plate (EP). The seal support (SS) and/or end plate (EP) can comprise any magnetic or magnetically attractive material to facilitate this coupling. Alternatively, the seal support (SS) or end plate (EP) may comprise magnetic strips or elements that are disposed on, or formed in, the coupling surfaces. In another instance, the seal support (SS) can be coupled to the end plate (EP) using fasteners, latches, tongues and grooves, connection tabs, or the like. In another example, the seal support (SS) may simply rest on the end plate (EP), or within the interior flange (IF) of the end plate (EP), without any additional coupling and may be held in place by the weight of the fluid (F). In yet another example, the seal support (SS) can be permanently or semi-permanently coupled to the end plate (EP) or can be integrally formed as part of the end plate (EP).

A seal may be provided or formed between the end plate (EP) and the opposing lower surface (S2) of the seal support (SS). The seal may be coupled to one or both components and the seal prevents the fluid (F) from leaking between these components. During scanning, the upper surface (S1) of the seal support (SS) and the elastic material (EM) are exposed to the fluid (F) within the reservoir interior (RI), while the opposing lower surface (S2) of the seal support (SS) may or may not be exposed to the fluid (F) depending on whether a seal is present, or the location of the seal.

Figure 11:
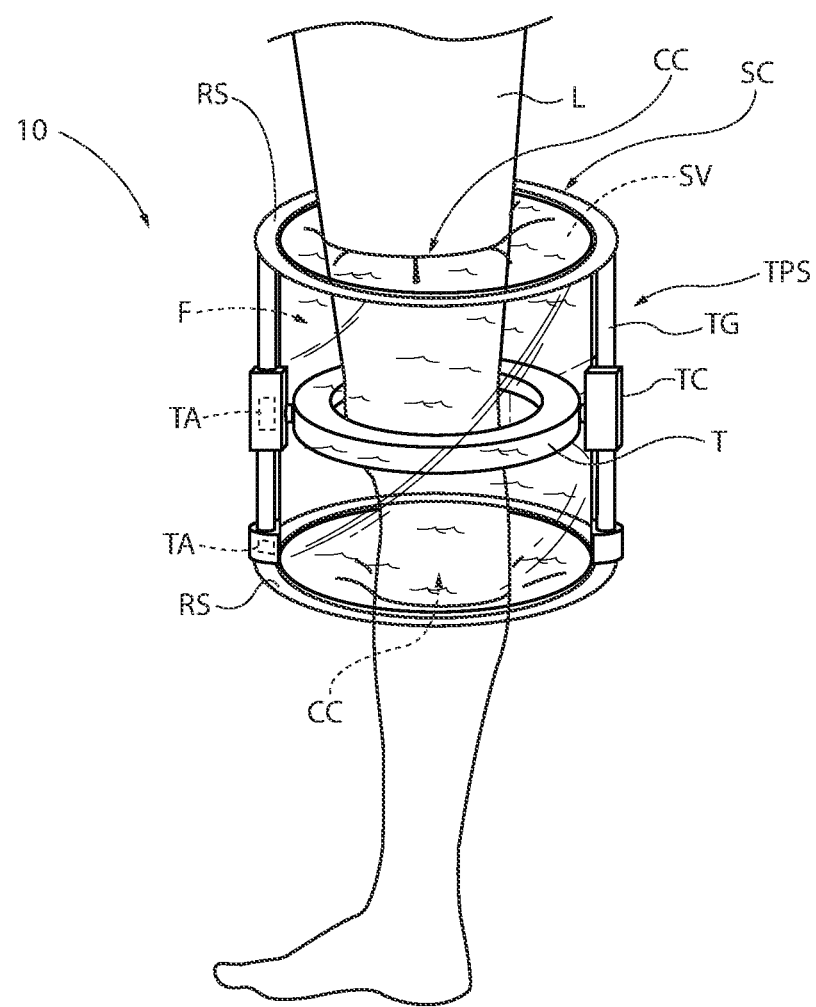
FIG. 11 illustrates an example of a sleeve container that is to be worn by the patient and fitted around the limb, wherein the transducer is disposed within a sealed volume of the container and the exterior-located transducer positioning system couples to the transducer using non-contact coupling to move the transducer.

Other examples are contemplated for creating the seal around the limb (L). For example, the material at the distal closure (DC) may not be elastic or coupled to the seal support (SS) but may nevertheless provide sealing capabilities. For example, rather than the seal support (SS), a rigid surface may extend across the bottom of the reservoir (R). At the center region of the rigid surface, a sealing sleeve may be provided which includes a channel that is sized to receive the limb (L) therethrough. The channel of the sealing sleeve extends from the reservoir interior (RI) to the exterior of the reservoir (R). The sealing sleeve may include a material or feature (such as an O-ring) that locally fits around the limb (L) to create a fluid-tight seal. Another example of a sleeve-like system is shown in FIG. 11 and will be described below. In certain instances, the distal closure (DC) may be configured as a rigid bottom wall of the reservoir (R) that cannot be penetrated by the limb (L).

D. Transducer

Figure 10:
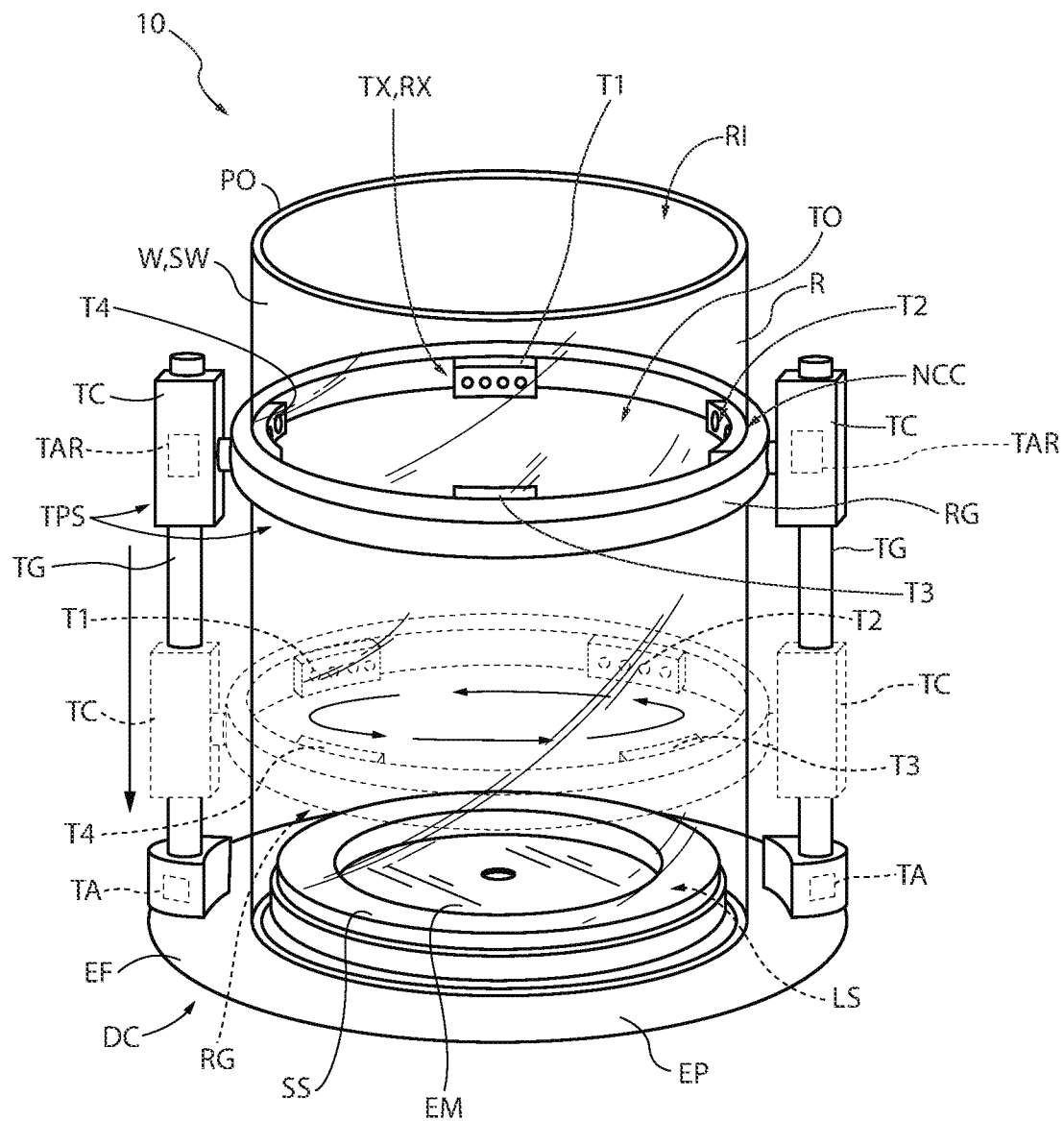
FIG. 10 illustrates an implementation of the ultrasound scanning system wherein the transducer positioning assembly comprises a rotational guide that couples to separate transducers using non-contact coupling to rotate the transducers within the reservoir, according to one implementation.

As shown in FIG. 1, the ultrasound scanning system 10 includes a transducer (T) that is disposed within the reservoir (R). In the examples shown, the transducer (T) is ring-shaped. However, other geometry of the transducer (T) is contemplated. For example, the transducer (T) can be square, ellipse, polygonal shaped, or the like. In the examples shown, the transducer (T) defines a closed geometry, e.g., a closed circle. However, the transducer (T) can also have an open geometry, such as a C-shape. As shown in FIG. 1, the transducer (T) comprises a single body. However, in an alternate configuration, as shown in FIG. 10, the transducer (T) may comprise a plurality of transducer bodies (T1, T2 . . . TN) that are separated from one another.

The transducer (T) defines an interior opening (TO) such that the limb (L) can pass through the interior opening (TO) of the transducer (T). The interior opening (TO) may be defined a closed geometry, or an open geometry, of the surrounding transducer (T). The interior opening (TO) of the transducer (T) can be circular, or any other shape.

The transducer (T) is an ultrasound transducer that comprises at least one ultrasound emitter and at least one ultrasound receiver. As can be seen in FIGS. 2 and 4, the transducer (T) includes an array or emitters (TX) and an array of receivers (RX). The arrays (TX, RX) can be defined in a circular pattern. In one example, the array is arranged such that the emitters (TX) and receivers (RX) are sequentially arranged and alternating (e.g., emitter, receiver, emitter, receiver). However, other types of array geometry and configurations are contemplated.

The transducer (T) is configured to be hermetically sealed and submergible in the fluid (F) within the reservoir (R). Acoustic waveforms are transmitted from one or more of the emitters (TX) towards the limb (L). The acoustic waves are propagated through the fluid (F). These waveforms are non-ionizing ultrasound pulses. When the ring transducer (T) is utilized, the emitted acoustic waveforms surround the limb (L), i.e., 360 degrees. One or more of the receivers (RX) detect acoustic signals from the acoustic waveforms that interact with the tissues of the limb (L). The acoustic waveforms can be frequencies of approximately 1-20 MHz, or any suitable frequency. When the waveforms interact with the tissue, the waveforms can scatter, diffuse, reflect, and/or refract off the tissue back to the emitters (TX) along any numerous types of travel paths, such as straight, bent, or curved paths. The transducer (T) can be a phased array transducer whereby each of the emitters (TX) of the array can be pulsed independently according to variable timing. By varying the timing, the waveforms can be steered or swept electronically. As will be described below, the transducer (T) can move in any suitable direction, such as along the transverse plane, coronal plane, or sagittal plane of the patient. Additionally, in some instances, the transducer (T) may be configured to rotate about any of these planes during scanning.

In one example, the ring-shaped transducer (T) comprises 2000-3000 transducer elements and can produce 12 to 24-bit data resolution images. The ring-shaped transducer (T), in one example, has a diameter in the range of 200-300 mm. However, any suitable number of transducer elements are contemplated. Furthermore, the beam overlap, image resolution, and size or geometry of the transducer (T) can be different from those described.

E. Control System

The ultrasound scanning system 10 includes a control system (CS). The control system (CS) is configured to, among other things, control operation of the transducer (T). For example, the control system (CS) can activate/deactivate the arrays (TX/RX), control the phase timing of the arrays, and/or adjust the gain or adjust the beam direction or acoustic waveforms generated by the emitters (TX). The control system (CS) is configured to receive scans from the transducer (T). The scans can be slice-by-slice images of the tissue region that is disposed within the interior opening (TO) of the transducer (T) at the time of each scan. The scans can be A-mode, B-mode, C-mode, and/or M-mode and the control system (CS) can selectively switch between these modes. The scans can be acquired quickly by the transducer (T), e.g., 1 second or less per slice. For each scan, the transducer (T) can be moved by any incremental displacement. The control system (CS) may include a non-transitory storage medium that is configured to store the imaging data produced by the transducer (T). The control system (CS) may perform signal processing for, and analysis of, the detected acoustic signals. The control system (CS) may be located remote from the transducer (T). For example, the control system (CS) can be in the base (B) of the scanning system 10, coupled to the exterior of the reservoir (R), disposed within a sealed enclosure disposed within the reservoir interior (RI), supported by the distal closure (DC), within the transducer positioning system (TPS), within reservoir positioning system (RPS), and the like. Alternatively, the control system (CS) may be located within the transducer (T) itself. The transducer (T) is configured to communicate with the control system (CS), and vice-versa, using wired or wireless communication. For example, the transducer (T) may communicate using Bluetooth, WiFi, or any other type of wireless communication protocol.

The control system (CS) is also configured to control any of the described components or sub-systems of the scanning system 10. As will be described below, the control system (CS) is configured to control transducer positioning system (TPS) that moves the transducer (T), a reservoir positioning system (RPS) that moves the reservoir (R), a sub-system that can heat or cool the fluid (F), a user interface (UI) and display device, and the like. As will be described below, the control system (CS) can also process images or scans from the transducer (T), create patient models based on the scans, etc. In other instances, the control system (CS) can implement limb motion compensation algorithm or an acoustic impedance matching algorithm. Other functions of the control system (CS) will be understood throughout this description.

The control system (CS) can include one or more processors, memory, and the like. The control system (CS) can be one or more computers that is/are separate from the scanning system 10 or could be embedded within the body of the scanning system 10. The control system (CS) may communicate with any of the sub-systems using wired or wireless connections. The control system (CS) could also be implemented using a cloud-computing setup and may transfer/receive patient data, software updates, service reports, or control commands to/from a remote sever.

F. Transducer Positioning System

As best shown in FIG. 2, the ultrasound scanning system 10 includes a transducer positioning system (TPS) that is configured to move the transducer (T) within the reservoir interior (RI) to enable scanning of the limb (L) at various poses. The various poses can be positions and/or orientations of the transducer (T) in up to 6 degrees of freedom. The transducer positioning system (TPS) is advantageously disposed outside of the reservoir (R) such that it does not interfere with the scan, the patient, or expose electrical components to the fluid (F).

The transducer positioning system (TPS) includes an actuator (TA) configured to move a transducer carriage (TC) along a guide (TG). The actuator (TA), in one example, is a linear actuator. In other examples, the actuator (TA) can be a rotational actuator. The actuator (TA) is disposed exterior to the reservoir (R). The actuator (TA) can be in a fixed location such as on or near the end plate (EP) or incorporated within the guide (TG). Alternatively, the actuator (TA) can be part of a moving component, such as the transducer carriage (TC). The actuator (TA) is coupled to the control system (CS), which controls the actuator (TA) to move the transducer carriage (TC) to predetermined positions. The control system (CS) can be programmed to move the transducer carriage (TC) according to a scanning protocol and to predetermined positions that depend on the patient anatomy (A), transducer operation or configuration, and/or type of scan desired. For example, between sequential scans, the transducer positioning system (TPS) can be controlled to move the transducer (T) by any incremental displacement, such as 1, 2 or 5 mm increments. In other instances, the user interface (UI) may include buttons and/or a display device that enables the user to control the operation and/or positioning of the transducer positioning system (TPS). In some instances, the transducer positioning system (TPS) may include one or more position sensors to determine the relative position of the transducer carriage (TC) relative to the guide (TG). The position sensors can be coupled to the actuator (TA), guide (TG), the transducer carriage (TC), or any combination thereof. Example position sensors include Hall effect sensors, position encoders, linear variable differential transformers (LVDT), capacitive or inductive displacement sensors, potentiometers, proximity sensors, internal sensors, or the like.

The guide (TG) of the transducer positioning system (TPS) defines a pathway along which the transducer carriage (TC) moves. The guide (TG) is disposed exterior to the reservoir (R). In the example shown in FIG. 2, the guide (TG) provides a linear pathway. In one example, the guide (TG) is a track, which can be a linear track that extends along the side wall(s) (SW) of the reservoir (R). As shown in FIG. 2, the guide (TG) can extend from, or between, the proximal reservoir opening (PO) and the distal closure (DC) to provide a full range of axial motion relative to the reservoir interior (RI). Alternatively, the guide (TG) can extend along only that part of the reservoir (R) wherein scanning is to occur. In one example, the reservoir (R) defines an axis between the proximal reservoir opening (PO) and the distal closure (DC) and the guide (TG) is a linear guide oriented parallel to the reservoir axis (RA). Responsive to actuation, the transducer carriage (TC) may move within the guide (TG), on the outside of the guide (TG), or along with the guide (TG). The guide (TG) can take various forms. For example, the actuator (TA) and the transducer carriage (TC) can be coupled to a belt, chain, pully, linear track, spring system (mechanical or pneumatic), lead screw, or the like. In the example of a lead screw, the transducer carriage (TC) is threadedly coupled to the lead screw and the actuator (TA) rotates the lead screw to linearly move the transducer carriage (TC). The transducer carriage (TC) is designed to firmly remain in its current position whenever actuation stops.

In the implementation wherein the reservoir (R) has a rigid body, the guide (TG) of the transducer positioning system (TPS) can be supported by an exterior surface of one or more walls (W) of the reservoir (R). For example, the guide (TG) can be fastened or adhered to the exterior surface of the reservoir (R) without breaching the wall (W).

In the implementation wherein the reservoir (R) has a flexible body, such as shown in FIGS. 8 and 9, the guide (TG) of the transducer positioning system (TPS) can be coupled to the flexible body. In one example, the guide (TG) is coupled to directly to the exterior surface of wall (W) of the flexible body. In another example, as shown in FIGS. 8 and 9, the guide (TG) is coupled to a separate rigid support (RS) that is coupled to the exterior of the flexible body. For example, the rigid support (RS) can be a support ring that surrounds the flexible body at, or near, the proximal reservoir opening (PO). The rigid support ring (RS) can be coupled to, or embedded within, the flexible body to help support the shape of the reservoir (R). The rigid support ring (RS) can also be pulled to assist with moving the flexible body of the reservoir (R) from a collapsed state to an expanded state, and vice-versa. The guide (TG) can extend between the end plate (EP) and the rigid support (RS) near the proximal opening (PO). In other examples, the guide (TG) may have a telescoping or extendable configuration that can collapse and expand with the flexible body of the reservoir (R).

The transducer carriage (TC) is configured to couple to the transducer (T). The transducer positioning system (TPS) is configured to move the transducer carriage (TC) along the guide (TG) to move the transducer (T) within the reservoir interior (RI). This movement can be shown in FIG. 2, which shows an example wherein the transducer (T) is moved from a first position nearer to the proximal opening (PO) of the reservoir (R) to a second position nearer to the distal closure (DC). The range of motion of the transducer positioning system (TPS) can be different from that shown and the transducer (T) can be moved to any number of positions.

Figure 3:
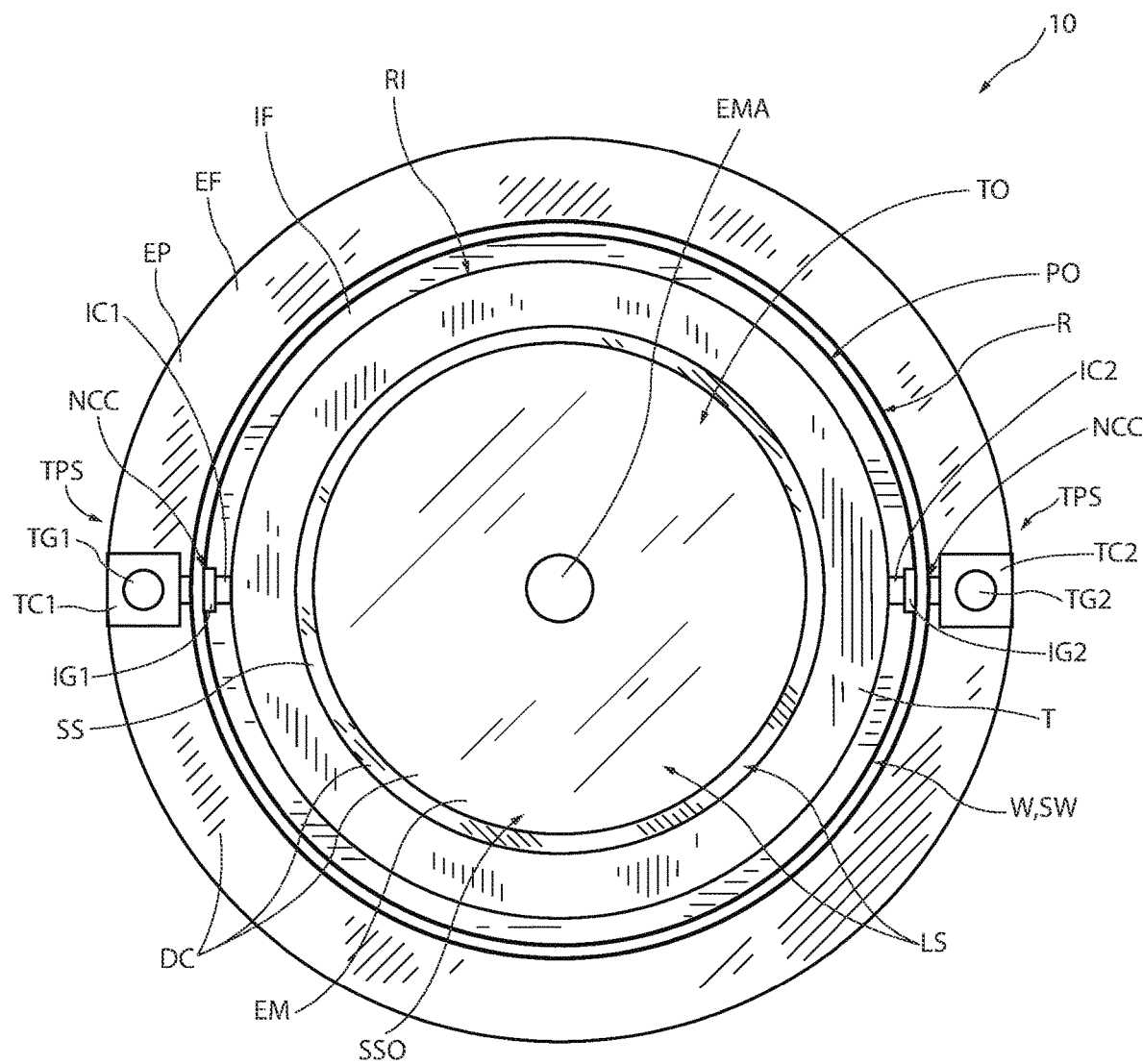
FIG. 3 is a top view of the components of the ultrasound scanning system of FIG. 2.

In one implementation, as best shown in FIGS. 2 and 3, the transducer carriage (TC) is configured to couple to the transducer (T) across the one or more walls (W) of the reservoir (R) using a non-contact coupling (NCC) mechanism or configuration. This coupling (NCC) is accomplished without creating a hole or slot through the side wall (SW) of the reservoir (R), thereby avoiding leakage of fluid or component failure. Using the non-contact coupling (NCC), the scanning system 10 avoids having any other moving components within the reservoir (R) other than the transducer (T). Hence, this non-contact coupling (NCC) also avoids having exposed electrical or electronic components submerged within the fluid, which is particularly relevant for the patient's safety when the limb is also within the fluid.

In one example, the non-contact coupling (NCC) is implemented by having the transducer carriage (TC) and/or the transducer (T) comprise a magnetic or magnetically attractive material that are adapted to couple to each other across or through the side wall (SW) of the reservoir (R). These attractive elements are configured to both face each other with the full thickness of the wall (W) of the reservoir (R) disposed therebetween. The force of the non-contact coupling (NCC) should be strong enough to cross the thickness of the wall (W) while also being able to support the weight of the transducer (T). The non-contact coupling (NCC) between the transducer carriage (TC) and the transducer (T) may be strong enough to enable a stable coupling to the transducer (T) such that when the transducer position system (TPS) is activated, the transducer (T) can slide along the interior surface of the reservoir (R) without a need for any additional support structure within the reservoir interior (RI). Any type of non-contact coupling (NCC) is contemplated, including inductive coupling, capacitive coupling, electro-magnetic coupling, and the like. Such examples of non-contact coupling (NCC) are suitable for coupling to the transducer (T) even when the reservoir (R) is filled with the fluid (F).

In the non-limiting example shown in FIG. 2, the transducer positioning system (TPS) includes a first actuator (TA1) configured to move a first transducer carriage (TC1) along a first linear guide (TG1) and a second actuator (TA2) configured to move a second transducer carriage (TC2) along a second linear guide (TG2). The first transducer carriage (TC1) and the second transducer carriage (TC2) are each magnetically coupled to the ring-shaped transducer (T) through the side wall (SW) of the reservoir (R). The first linear guide (TG1) and first transducer carriage (TC1) are located on one side of the reservoir (R) and the ring-shaped transducer (T). The second linear guide (TG2) and second transducer carriage (TC2) are located on an opposing side of the reservoir (R) and the ring-shaped transducer (T). The optional interior guides (IG1, IG2) may be provided to provide additional support for the transducer (T). Within the reservoir (R), the transducer (T) is supported by the first and second transducer carriages (TC1, TC2) and interior guides (IG1, IG2) at opposing sides. The control system (CS) is configured to control the first and second actuators (TA1, TA2) to simultaneously move the first and second transducer carriages (TC1, TC2) along the first and second linear guides (TG1, TG2) to move the transducer (T) within the reservoir interior (RI).

As described above, in some implementations, the distal closure (DC) comprises the exterior flange (EF) that extends outside of the reservoir (R). In such scenarios, the guide (TG) of the transducer positioning system (TPS) can be supported by, or coupled to, the exterior flange (EF) of the distal closure (DC), as shown in FIG. 2.

In some instances, the ultrasound scanning system 10 may comprise a base (B) that is supported by a floor surface, as shown in FIG. 1. The base (B) can be like a cart that has wheels that enable the base (B) to move along the floor surface. Alternatively, the base (B) can have legs or a flat surface that rest stationary on the floor surface. When the base (B) is used, it is contemplated that the transducer positioning system (TPS), or any components thereof, can be directly or indirectly supported by the base (B).

In other examples, the transducer carriage (TC) may be coupled directly to the transducer (T) without using non-contact coupling (NCC) while still avoiding having electrical or electronic components submerged by the fluid (F). For example, the transducer carriage (TC) may access the transducer (T) through the proximal reservoir opening (PO). In such instances, the transducer carriage (TC) may be disposed exterior to the reservoir (R), e.g., on the outside of, or above the proximal reservoir opening (PO), of the reservoir (R). The transducer carriage (TC) can couple directly to the transducer (T) using a wire, pully, or fixed member.

In another example, as shown in FIG. 10, the transducer (T) comprises a plurality of separate transducer bodies (T1, T2, T3, T4 . . . TN) within the reservoir (R). In this example, the transducer positioning system (TPS) comprises the linear guides (TG), actuators (TA) and transducer carriages (TC) that move along the linear guides (TG), as described above. However, in this example, the transducer carriages (TC) are also coupled to a rotational guide (RG). The rotational guide (RG) is located exterior to the reservoir (R) and is configured to rotate about the exterior of the reservoir (R). The rotational guide (RG) can be shaped like a ring. The transducer carriages (TC) may comprise actuators (TAR) that are configured to cause rotation of the rotational guide (RG). The rotational guide (RG) is coupled to each of the separate transducer bodies (TN) through the side wall (SW) of the reservoir (R) using the non-contact coupling (NCC) described above. The control system (CS) is configured to control the linear actuators (TA) to simultaneously move the first and second transducer carriages (TC) along the first and second linear guides (TG) to linearly (e.g., vertically) move the transducer bodies (TN) within the reservoir interior (RI). Moreover, the control system (CS) can control the actuators (TAR) within the transducer carriages (TC) to move the rotational guide (RG) for rotating the transducer bodies (TN) within the reservoir (R). As such, in this example, the rotational guide (RG) can enable the separate transducer bodies (TN) to capture a 360-degree scan of the limb (L), without necessarily requiring a ring-shaped transducer (T).

As shown in FIGS. 2 and 3, an interior guide (IG) optionally may be provided along the inside surface of the side wall (SW) within the reservoir (R) to provide additional support for movement of the transducer (T) within the reservoir (R). The interior guide (IG) may include an interior carriage (IC) that is fixed to the transducer (T). Alternatively, the interior carriage (IC) may be a feature of the transducer (T) that is supported by the interior guide (IG). The interior carriage (IC) passively moves along the interior guide (IG) responsive to the movement of the exterior-disposed transducer carriage (TC). That is, the interior guide (IG) may not have a dedicated actuator to move the interior carriage (IC). The interior guide (IG) may similarly extend along the axis (RA) of the reservoir (R) between the proximal reservoir opening (PO) and the distal closure (DC). In one example, the interior carriage (IC) is the component that couples to the exterior-disposed transducer carriage (TC) using non-contact coupling (NCC). Alternatively, the interior carriage (IC) may be a separate component, e.g., located above or below the transducer (T), to guide the transducer (T) along the interior guide (IG), without coupling to the transducer carriage (TC).

In other examples, the interior guide (IG) may be channel formed on the side wall (SW) of the reservoir (R) to facilitate components of the non-contact coupling (NCC) mechanism to be close to one another. For example, one or more components of the non-contact coupling (NCC) mechanism can fit into the channel of the interior guide (IG). The channel may extend outward and towards the exterior of the reservoir (R) or may extend inward and towards the reservoir interior (RI). In this example, the interior guide (IG) may be integrally part of the side wall (SW) such that no slot or aperture is formed through the side wall (SW) to cause leakage. Alternatively, the interior guide (IG) may include a separate component that is attached to the side wall (SW).

G. Reservoir Positioning System

The transducer positioning system (TPS) has been described above as a means to move the transducer (T) relative to the reservoir (R). To provide additional scanning mobility, convenience to the patient, and ease of setup, the ultrasound scanning system 10 may also include a reservoir positioning system (RPS) that is configured to move the entire reservoir (R), or portions of the reservoir (R). The reservoir positioning system (RPS) can adjust a pose (position and/or orientation) of the reservoir (R). The reservoir positioning system (RPS) is useful for setting the position of the reservoir (R) to enable proper scanning relative to the joint (J) of any given patient height and/or limb size. Moreover, the position of the reservoir (R) is sensitive to scenarios wherein the reservoir (R) enables the limb (L) to extend past the distal closure (DC). The reservoir positioning system (RPS) can adjust the pose of the reservoir (R) to ensure that the limb (L) can be properly sealed at the distal closure (DC). Moreover, as will be described below, the reservoir positioning system (RPS) can assist with adjusting the reservoir (R) to various positions to facilitate easy and convenient setup of the ultrasound scanning system 10 relative to the patient. The reservoir positioning system (RPS) can also move the transducer positioning system (TPS) when coupled to the reservoir (R). The control system (CS) can control the reservoir positioning system (RPS).

With reference to the examples shown in FIGS. 6-9, the reservoir positioning system (RPS) can be coupled to the base (B) that rests on (or within) the floor surface or is moveable with wheels along the floor surface. The reservoir positioning system (RPS) includes an actuator (RPA) configured to move a reservoir carriage (RC) along a guide (RG). The reservoir carriage (RC) is coupled to any suitable part of the reservoir (R), such as to the side wall (SW) or to the distal closure (DC). Using the actuator (RPA), the reservoir positioning system (RPS) moves the reservoir carriage (RC) along the guide (RG) to adjust a pose of the reservoir (R). In the example shown, the reservoir positioning system (RPS) adjusts a vertical position of the reservoir (R) relative to the floor surface. However, depending on the configuration of the reservoir (R), the reservoir positioning system (RPS) may be configured to adjust a horizontal position, or orientation of the reservoir (R) about any rotational axis.

The actuator (RPA), in one example, is a linear actuator. In other examples, the actuator (RPA) can be a rotational actuator. The actuator (RPA) is coupled to the control system (CS), which controls the actuator (RPA) to move the reservoir carriage (RC). The control system (CS) can be programmed to move the reservoir carriage (RC) according to a protocol to predetermined positions that depend on the patient anatomy (A), reservoir operation or configuration, and/or type of scan desired. In other instances, the user interface (UI) can be used to enable the user to control the operation and/or positioning of the reservoir positioning system (RPS). The reservoir positioning system (RPS) may include one or more position sensors to determine the relative position of the reservoir carriage (RC) relative to the guide (RG). The position sensors can be coupled to the actuator (RPA), the guide (RG), the reservoir carriage (RC), or any combination thereof. Example position sensors include Hall effect sensors, position encoders, linear variable differential transformers (LVDT), capacitive or inductive displacement sensors, potentiometers, proximity sensors, internal sensors, or the like.

The guide (RG) of the reservoir positioning system (RPS) defines a pathway along which the reservoir carriage (RC) moves. In the example shown, the guide (RG) is pathway is a linear pathway. In one example, the guide (RG) is a track, which can be a linear track that extends along a pillar that is coupled to the base (B) or that rests on the floor. The guide (RG) can extend along any length of the pillar to provide a full range of axial positioning for the reservoir (R). In one example, the guide (RG) of the reservoir positioning system (RPS) is a linear guide oriented parallel to the reservoir axis (RA). Responsive to actuation, the reservoir carriage (RC) may move within the guide (RG), on the outside of the guide (RG), or along with the guide (RG). The guide (RG) can take various forms. For example, the actuator (RPA) and the reservoir carriage (RC) can be coupled to a belt, chain, pully, linear track, spring system (mechanical or pneumatic), lead screw, or the like. In the example of a lead screw, the reservoir carriage (RC) is threadedly coupled to the lead screw and the actuator (RPA) rotates the lead screw to linearly move the reservoir carriage (RC). The reservoir carriage (RC) is designed to firmly remain in its current position whenever actuation stops.

Figure 6:
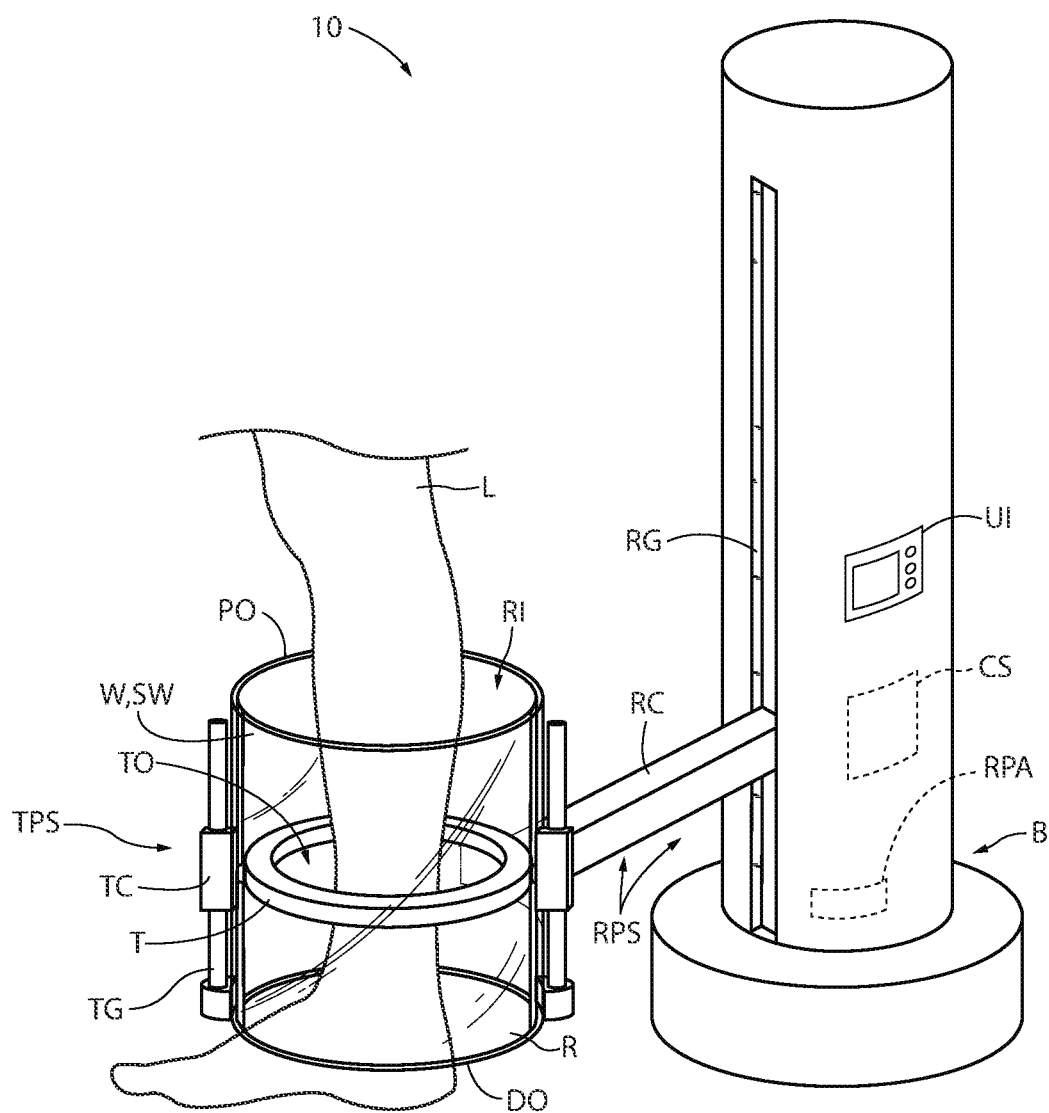
FIG. 6 illustrates the ultrasound scanning system including a reservoir positioning system having the reservoir positioned in a lowered state to enable the limb to step therein, according to one implementation wherein the reservoir has a rigid body.
Figure 7:
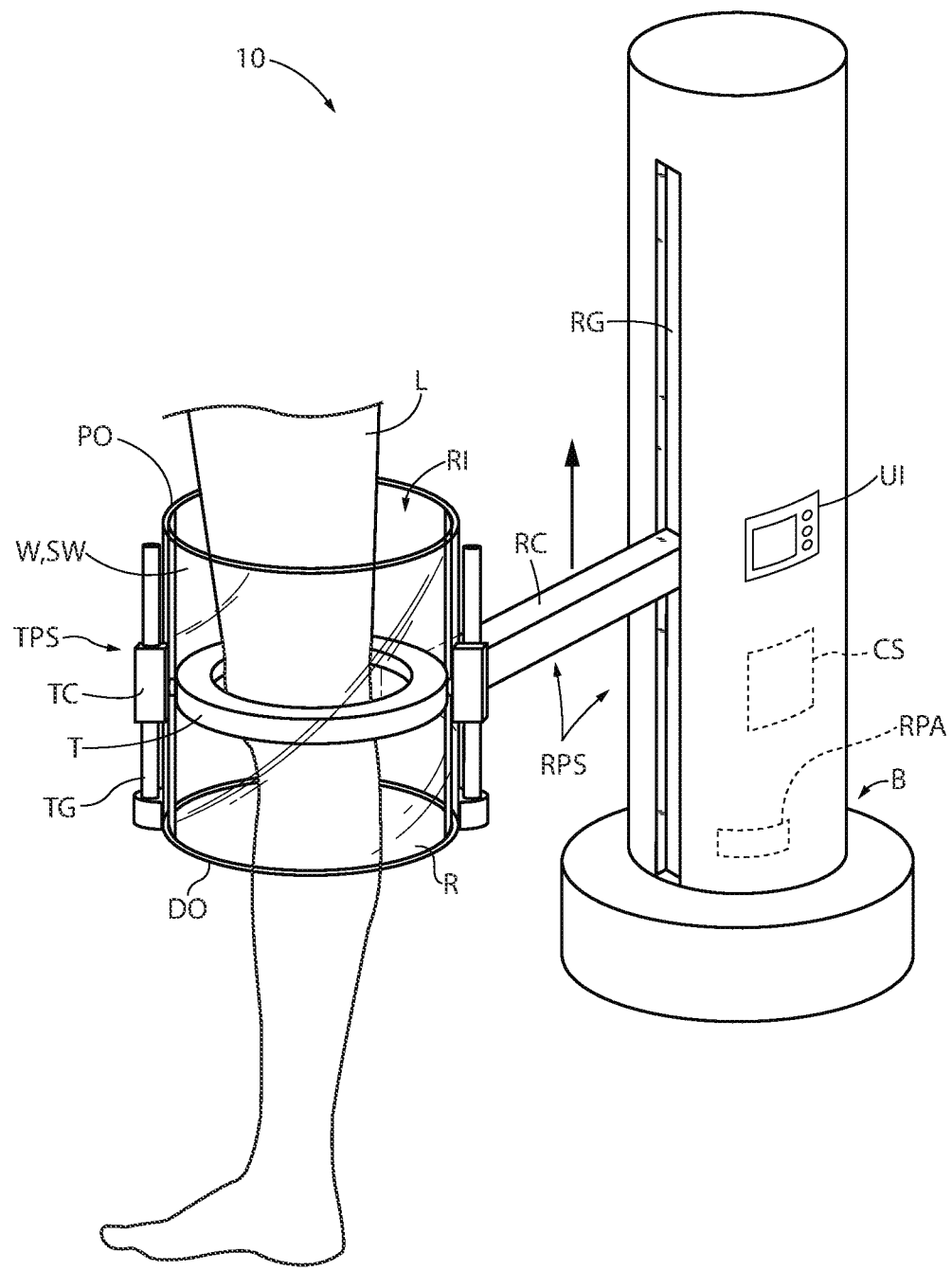
FIG. 7 illustrates the ultrasound scanning system of FIG. 6 but wherein the reservoir positioning system moves the reservoir to an elevated state to enable the joint of the limb to be encompassed within the reservoir interior.

In one implementation, as shown in FIGS. 6 and 7, the reservoir (R) has a rigid body. In such examples, the reservoir positioning system (RPS) is configured to move the reservoir carriage (RC) along the guide (RG) to move the entire reservoir (R) to various positions. Since the reservoir (R) is rigid, the proximal reservoir opening (PO) and distal closure (DC) will experience corresponding displacement. The reservoir carriage (RC) in this example could be mounted to the side wall (SW), the proximal reservoir opening (PO), the distal closure (DC), or any combinations thereof.

In another implementation, as shown in FIGS. 8 and 9, the reservoir (R) has wall(s) (W) made of a flexible material and the reservoir (R) is collapsible and expandable. Specifically, the reservoir (R) can be moved to, and between, a collapsed state (shown in FIG. 8) and an expanded state (as shown in FIG. 9). In the collapsed state, the proximal reservoir opening (PO) is spaced apart from the distal closure (DC) by a first distance. In the extended state, the proximal reservoir opening (PO) is spaced apart from the distal closure (DC) by a second distance that is greater than the first distance. In such examples, the reservoir positioning system (RPS) is configured to move the reservoir carriage (RC) along the guide to move the reservoir (R) at, and between, the collapsed state and the extended state. The reservoir carriage (RC) in this example could be mounted to the proximal reservoir opening (PO), or to a rigid support (RS) located at or near the proximal opening (PO). In turn, the reservoir carriage (RC) can move the proximal reservoir opening (PO) relative to a stationarily positioned distal closure (DC). This implementation can be utilized when the reservoir (R) is rested on the floor surface or when the reservoir (R) is lifted off the floor surface by the reservoir positioning system (RPS).

In another example, the reservoir (R) can be concealed within a container that either rests on the floor or is embedded within the floor such that the floor surface is uninterrupted. Here, the reservoir positioning system (RPS) is also collapsible within the container and can be coupled to the reservoir (R). The reservoir positioning system (RPS) may include telescoping or retractable actuators, for example.

The reservoir positioning system (RPS) can vertically move the reservoir (R) out of the container to the desired height and can move the reservoir (R) back down to the container. In this example, the patient can conveniently step on top of the container (or floor) without interference from the reservoir (R) or reservoir positioning system (RPS). The reservoir positioning system (RPS) can then gradually raise the reservoir (R) around the leg of the patient. The raising of the reservoir (R) around the leg can be performed with any version of the reservoir (R) or components described herein. For example, the reservoir (R) may have a rigid distal closure (DC) that remains at or near the container or floor surface. In other words, the patient can step on top of the distal closure (DC). Then, the flexible upper body of the reservoir (R) can be raised around the limb (L). Where the distal closure includes the limb seal (LS), as described above, the reservoir positioning system (RPS) can raise the distal closure (DC) out of the container and above the foot of the patient. This can be performed without or without the limb seal (LS) being initially attached to the reservoir (R). The container may include a ring-shaped opening, sized to the reservoir (R) and any surrounding components, to enable the reservoir (R) to expand out of, or retract into, the container. In another example, the reservoir (R) may be manually pulled out of the container and/or manually retracted back into the container without the reservoir positioning system (RPS).

H. Scanning System Setup Workflow

Having described the components of the ultrasound scanning system 10 above, described in this section are example steps involved with setting up and installing the ultrasound scanning system 10 relative to the patient. The steps described herein can be in any suitable order and are not necessarily limited to the order in which the steps are described. Furthermore, the steps herein can be utilized with any of the implementations of the ultrasound scanning system 10 described above.

With reference to FIG. 5, the workflow involves passing the limb (L) through the proximal reservoir opening (PO). For example, when the limb (L) is the leg, the patient may step into the reservoir (R) to place their leg inside the reservoir (R). To make this step convenient for the patient, the reservoir positioning system (RPS) can place the reservoir (R) in a lowered state (FIG. 6) or collapsed state (FIG. 8) to enable the patient to easily place their leg within the reservoir (R). Thereafter, the reservoir positioning system (RPS) can adjust the position of the reservoir (R) to encompass the joint (J) of the limb (L) within the reservoir interior (RI), as shown in FIGS. 7 and 9 Alternatively, the reservoir positioning system (RPS) can initially place the reservoir (R) at an estimated or programmed location whereby it is that the joint (J) for the specific patient would be encompassed by the reservoir interior (RI) and the user can thereafter place their limb (L) inside the reservoir (R). In another example, the reservoir positioning system (RPS) can move the reservoir (R) until the joint (J) is surrounded by the transducer (T). For any of the steps described herein, the reservoir positioning system (RPS) can be moved before, during, or after implementation of the respective step.

As the patient passes their limb (L) through the proximal reservoir opening (PO), the patient will also pass their limb (L) through the transducer (T) that is disposed within the reservoir (R). Specifically, the limb (L) will pass through the interior opening (TO) the transducer (T). The transducer positioning system (TPS) may place the transducer (T) at any suitable position during this step. In other words, it is not necessary that the transducer (T) be placed at the joint (J) of the limb (L) at this step. For example, the transducer positioning system (TPS) initially may place the transducer (T) at a location that is at or near the proximal opening of the reservoir (R) such that the transducer (T) is more readily visible to the patient and to reduce the likelihood of collisions between the limb (L) and the transducer (T).

The limb (L) can also pass through the distal closure (DC) of the reservoir (R) such that the limb (L) extends beyond the distal closure (DC). For example, when the limb (L) is a leg, the leg will extend past the distal closure (DC) such that the foot, ankle, and portion of the tibia are located below the distal closure (DC), while the knee and femur are located above the distal closure (DC), as shown in FIG. 1. In instances where the distal closure (DC) is configured attach to the reservoir (R) at the distal reservoir opening (DO), the workflow may include coupling the distal closure (DC) to the reservoir (R) after passing the limb (L) through the distal closure (DC), as shown in FIG. 5. Alternatively, the distal closure (DC) can be coupled to the reservoir (R) before passing the limb (L) through the distal closure (DC).

As described, the distal closure (DC) comprises the end plate (EP) and the limb seal (LS). The end plate (EP) has the interior flange (IF) that is configured to couple to the distal reservoir opening (DO). The end plate (EP) also has the end plate opening (EO). The limb seal (LS) is configured to be disposed within the reservoir interior (RI). The limb seal (LS) has the seal support (SS) that defines the seal support opening (SSO) and the elastic material (EM) that is coupled to the seal support (SS). The elastic material (EM) can extend across the seal support opening (SSO) and can define the aperture (EMA) for the limb (L).

Accordingly, the workflow includes fitting the distal closure (DC) around the limb (L) for creating a seal between the distal closure (DC) and the limb (L), as can be seen in FIG. 5. The steps may include passing the limb (L) through the end plate (EP), and more specifically, passing the limb (L) through the end plate opening (EO). During this step, the end plate (EP) may be coupled to the reservoir (R) or may be located below the reservoir (R), e.g., on a support surface. Separately, or simultaneously, the limb (L) may be passed through the seal support (SS), and more specifically, passed through the seal support opening (SSO) and through the aperture (EMA) of the elastic material (EM), as shown in FIG. 5. During this step, the seal support (SS) may be placed at various locations. For example, the seal support (SS) can be within the reservoir (R) and supported by the end plate (EP), as shown in FIG. 1. In another example, as shown in FIG. 5, the seal support (SS) may be separated from both the reservoir (R) and the end plate (EP) and may be located below the reservoir (R), e.g., on a support surface. Alternatively, the seal support (SS) may be supported by the end plate (EP) but both the end plate (EP) and the seal support (SS) are disconnected from the reservoir (R).

The workflow includes the step of fitting the elastic material (EM) around the limb (L) for creating the seal between the elastic material (EM) and the limb (L). In one example, this step can be performed when the end plate (EP) is coupled to the reservoir (R) and after the limb seal (LS) is located within the reservoir (R) and supported by the end plate (EP), as shown in FIG. 1. The limb seal (LS) may be placed at a desired position that is adjusted to the limb (L) using the reservoir positioning system (RPS). For example, when the limb (L) is a leg, the desired position of the limb seal (LS) will be such that the foot, ankle, and portion of the tibia are located below the limb seal (LS), while the knee and femur are located above the limb seal (LS). In one example, before the elastic material (EM) is fitted around the limb (L), the reservoir positioning system (RPS) may initially adjust the reservoir (R) such that the limb seal (LS) is at the desired position. Thereafter, the limb (L) can be passed through the limb seal (LS) when the limb seal (LS) is at the desired position. Alternatively, the reservoir positioning system (RPS) may move the reservoir (R) after the elastic material (EM) is fitted around the limb (L). During this step, the limb (L) is first passed through the limb seal (LS), and then the reservoir positioning system (RPS) moves the reservoir (R) such that the limb seal (LS) moves along the surface of the limb (L) until the limb seal (LS) is placed at the desired position.

Alternatively, when the limb seal (LS) is disconnected from the reservoir (R), as shown in FIG. 5, the workflow may include fitting the elastic material (EM) around the limb (L) and manually moving the limb seal (LS) along the surface of the limb (L) from an initial position to an estimated desired position of where the distal closure (DC) of the reservoir (R) should be located relative to the limb (L). In this example, the reservoir positioning system (RPS) places the reservoir (R) at a location that encompasses the joint (J) of the limb (L). The limb seal (LS) is disconnected from the reservoir (R) and may be manually moved along the limb surface by a technician, or the patient, until the limb seal (LS) is positioned to be disposed within, or is disposed within, the reservoir (R). This step of positioning the limb seal (LS) can be performed without the end plate (EP). For example, the limb seal (LS) can be manually moved to and held at the desired position of the limb (L) based on the tension of the elastic seal. Thereafter, the end plate (EP) can be moved towards the distal reservoir opening (DO) and attached to the reservoir (R). When attached to the reservoir (R), the interior flange (IF) of the end plate (EP) will support the limb seal (LS) and the limb seal (LS) will couple to the end plate (EP), e.g., using magnetic coupling. Alternatively, the step of positioning the limb seal (LS) can be performed with the end plate (EP). For example, the limb seal (LS) can be supported by the end plate (EP) when both the end plate (EP) and limb seal (LS) are disconnected from the reservoir (R). While disconnected from the reservoir (R), the limb seal (LS) can be initially coupled to the end plate (EP), e.g., using magnetic coupling. The elastic material (EM) is fitted around the limb (L). Thereafter, the end plate (EP) and the limb seal (LS), together, can be moved along the limb (L) and towards the reservoir (R) until the end plate (EP) can be attached to the reservoir (R). In some instances, the end plate (EP) can first be secured to the reservoir (R), and thereafter, the limb seal (LS) can be inserted into the reservoir (R) through the proximal reservoir opening (PO) to engage the end plate (EP).

After the reservoir (R) is positioned to encompasses the joint (J) of the limb (L), and after creating the seal between the elastic material (EM) and the limb (L), the reservoir (R) can be filled with the fluid (F). This step can be performed by pouring the fluid (F) through the proximal reservoir opening (PO) or by feeding the fluid (F) through a tube that is within the reservoir interior (RI). In either scenario, the fluid (F) is prevented from escaping the distal reservoir opening (DO) by virtue of the seal created between the elastic material (EM) and the limb (L). The end plate (EP), together with the limb seal (LS), can support the weight of the fluid (F) against the force of gravity.

With the fluid-filled reservoir (R), the scanning process can begin. The control system (CS) controls the transducer (T) to activate ultrasound the emitters (TX) and receivers (RX). The control system (CS) then can perform a series of 360-degree scans of the joint (J), as described above. The control system (CS) controls the transducer positioning system (TPS) to move the transducer (T) within the reservoir interior (RI) to scan the joint (J). As described, this movement can be performed according to a predetermined scanning protocol and/or based on user settings. After scanning, the patient can remove the limb (L) from the reservoir (R) and the fluid (F) can be drained.

Based on the scans of the joint (J), the control system (CS) can obtain imaging data of the joint (J) and can create a 3D model of the joint (J) based on the scan. The 3D model can be in any suitable format, such as a point cloud, a 3D solid surface model, a patient specific model, or a statistical model of a similar joint that is morphed into a patient specific model. For example, the control system (CS) can generate a 3D point cloud or contour based on the scan of the joint (J). Here, the surface of the joint (J) can be extracted from the scan. In one example, the transducer (T) generates a continuous contour scan and the 3D model can be constructed. For example, the continuous scans can be stitched together to generate the 3D model. In another example, the control system (CS) can obtain a statistical model or statistical shape model (SSM) that is similar to the joint (J) based on a patient population. The control system (CS) can merge or fit the 3D point cloud or contour and the statistical model to generate the 3D model of the joint (J). Other methods of forming a 3D model are contemplated. The 3D model can be utilized for various surgical planning purposes. For instance, when the joint (J) is a knee joint, the 3D model can be utilized to facilitate planning of implant position, implant size, cutting planes, cutting tool paths, virtual boundaries, target depths, target trajectories, and the like.

In one implementation, the ultrasound scanning system 10 described herein can be utilized for generating image data that be utilized for surgical planning that can be performed by a robotic surgical system. The robotic surgical system can a robotic manipulator that is supported by the floor surface and that comprises a robotic arm that includes plurality of links and joints. One possible arrangement of the manipulator is described in U.S. Pat. No. 9,119,655, filed on Aug. 2, 2013, entitled, "Surgical Manipulator Capable of Controlling a Surgical Instrument in Multiple Modes," the disclosure of which is hereby incorporated by reference. Alternatively, the robotic surgical system can include a hand-held robotic tool or hand-held manipulator like that described in U.S. Pat. No. 9,707,043, filed on Aug. 31, 2012, entitled, "Surgical Instrument Including Housing, A Cutting Accessory that Extends from the Housing and Actuators that Establish the Position of the Cutting Accessory Relative to the Housing," or like that described in PCT application No. PCT/US2020/042128, entitled "Robotic Hand-Held Surgical Instrument Systems and Methods", filed on Jul. 15, 2020, the entire contents of both of which are hereby incorporated by reference.

I. Sleeve Container

With reference to FIG. 11, an alternative arrangement is shown wherein the scanning system 10 provides a sleeve container (SC) instead of the reservoir (R). The sleeve container (SC) is sleeve or cuff-shape and is adapted to worn by the patient and fitted around the limb (L). The sleeve container (SC) defines a sealed volume (SV) which stores the fluid (F) therein. The sealed volume (SV) may be a bladder or any other type of container. The sealed volume (SV) may be pre-filled or filled by a technician. The exterior of the sleeve container (SC) may be flexible or protected by a rigid body. The interior of the sleeve container (SC) has a central channel (CC) formed through the sealed volume (SV) to enable the limb (L) to pass therethrough. The central channel (CC) is flexible to adapt to the shape of the limb (L) throughout the length of the central channel (CC). The central channel (CC) is also open and without fluid (F). The central channel (CC) is surrounded by interior walls of the sealed volume (SV) that has the fluid (F) sealed therein. The sleeve container (SC) fits around the limb (L) without directly exposing the limb (L) to any fluid (F). At the same time, due to the flexibility of the central channel (CC), the surrounding interior walls of the sealed volume (SV) will be brought in direct contact with the limb (L) to enable the fluid (F) to be in close proximity to the limb (L) to enable scanning.

The central channel (CC) can have an interior diameter that is deliberately sized to be less than the diameter of the limb (L). This way, pressure caused by the fluid (F) mass can be applied by the walls of the central channel (CC) to the limb (L). This pressure can assist to hold the sleeve container (SC) to the limb (L) without assistance from an additional support system. Alternatively, or additionally, a pump can be utilized to adjust the size of the central channel (CC) to enable fitting the sleeve container (SC) to different sized limbs (L). In some instances, a separate bladder may be fitted inside the central channel (CC) and the bladder can be pumped using air or fluid to adjust the size of the central channel (CC) for different sized limbs (L). The central channel (CC) can be shaped and sized specifically for the knee joint. For example, the sleeve container (SC) may cover the entire knee, as well as adjacent portions of the thigh, and upper calf. The central channel (CC) can include different sized widths to accommodate the thigh, knee, and calf. The different sized diameters of the central channel (CC) can help to hold the sleeve container (SC) to the limb (L). In another example, a sleeve container positioning system can be utilized, like the reservoir positioning system (RPS) described above. Alternatively, the sleeve container (SC) can be held in place by a rigid, or manually adjustable support.

The transducer (T) is disposed within the sealed volume (SV) of the sleeve container (SC) and submerged by the fluid (F). The transducer (T) can be ring-shaped and can encircle the limb (L) while the transducer (T) is sealed within the sealed volume (SV). The sleeve container (SC) can be coupled to the transducer positioning system (TPS), like that described above, to move the transducer (T) within the sealed volume (SV) of the sleeve container (SC). The transducer positioning system (TPS) can be disposed within the sealed volume (SV) and/or exterior to the sleeve container (SC). For example, the transducer positioning system (TPS) can be coupled to rigid supports (RS) located at the top and/or bottom of the sleeve container (SC). As described, a non-contact coupling (NCC) can be utilized to move the transducer (T) within the sealed volume (SV). The sleeve container (SC) can also be coupled to a sleeve positioning system, similar to the reservoir positioning system (RPS) to move the sleeve container to various positions. Any other features, components, methods, workflows, or techniques described in the specification may be applied to the sleeve container configuration.

J. Motion Compensation Algorithm

The control system (CS) is configured to implement an algorithm that can compensate for limb (L) motion that may occur during scanning. The control system (CS) controls the transducer (T) to produce a first scan of the joint (J) at a first location relative to the joint (J). After completion of the first scan, the transducer (T) is moved relative to the joint (J) using the transducer positioning system (TPS). The control system (CS) then controls the transducer (T) to produce a second scan of the joint (J) at a second location relative to the joint (J). During, or between, movement from the first location to the second location, it is possible that the limb (L) may move. Therefore, the first and second scans may be misaligned. The control system (CS) can compare the first and second scans to detect a misalignment between the first and second scans. The misalignment is indicative of a pose of the limb changing after the first scan. Based on the detected misalignment, the control system (CS) can determine one or more modifications to apply to either the first scan or the second scan to correct the misalignment. The scans can then be stitched together after correction of the misalignment. A 3D model of the patient can then be generated, in part, based on the stitched first and second scans.

The technique is particularly useful when the transducer (T) produces C-mode images that are taken according to a lateral section of the joint (J) perpendicular to the direction of sound propagation, rather than a cross-section parallel to the direction of sound propagation, as in B-mode scanning. Using C-mode scanning at different heights relative to the joint (J), the surface area of the joint (J) can be generated. The stitching can involve detecting and/or combining overlaps between the surface areas within the scans. In order to estimate scan alignment, the control system (CS) can determine the appropriate mathematical model relating pixel coordinates in the first scan to pixel coordinates in the second scan. Gradient descent and other optimization techniques can be used to estimate these parameters. Additionally, or alternatively, distinctive features can be found in each scan and then matched to establish correspondences between the scans. For example, the control system (CS) can compute a global set of alignment features to efficiently detect overlap in the scans. The control system (CS) can warp, transform, or blend any scan as needed to stitch together the scans. In some instances, the control system (CS) determines coordinates within the scans to generate translations and/or rotations to align the scans. Other techniques for processing the scans for compensating for limb motion are contemplated.

K. Control system to Adjust Transducer Gain

The control system (CS) is configured to implement a control scheme to adjust the gain, or attenuation, of the transducer (T). In one example, the control scheme can be based on a parameter related to the fluid (F). The parameter can be detected by a sensor located within the reservoir interior (RI). The detected parameter can be density, temperature, thermal conductivity, shear viscosity, bulk viscosity, heat per unit mass, pressure, and the like. In one example, the parameter of the fluid (F) is density and the ultrasound scanning system 10 include the sensor to sense the density of the fluid (F) within the reservoir interior (RI). The control system (CS) is coupled to the sensor and receives measurements from the sensor. The sensor can be any sensor to measure density of the fluid (F) including, but not limited to a: pressure sensor or gauge, red meter, Coriolis meter, microwave sensor, ultrasonic sensor. The control system (CS) determines, from the sensor, the density of the fluid (F) within the reservoir interior. From this determination, the control system (CS) can adjust a gain of the transducer (T) before or during scanning of the joint (J). Specifically, the gain of the transducer (T) can be adjusted to optimize the efficacy or scanning efficiency of the transducer (T). The transducer (T) gain could be calibrated, from the factory, before use, or when the transducer (T) is first exposed to the fluid (F). The control system can then update these prior calibration settings based on the detected environment between the transducer (T) and the anatomy (A). Additionally, or alternatively, the fluid (F) itself can be manipulated to optimize efficacy. For instance, the fluid (F) could be heated or cooled using a heating/cooling element within the reservoir interior (RI).

L. Adjusting Fluid for Impedance Matching

The control system (CS) may be configured to manipulate the fluid (F) within the reservoir (R) to optimize scanning. In one example, the scanning system 10 includes a sensor and a heating/cooling element within the reservoir interior (RI). The sensor measures the temperature and/or density of the fluid (F). The heating/cooling element directly interacts with the fluid (F) to raise or lower the temperature of the fluid (F). The density of the fluid (F) will be affected by the temperature of the fluid (F). The control system (CS) is coupled to the sensor and heating/cooling element and can control the heating/cooling element based on sensor readings.

In one example, the control system (CS) modifies the temperature of the fluid (F) such that the fluid (F) is acoustically impedance matched to the tissue of the limb (L) or joint (J). When the ultrasound waveform from the transducer (T) travels through the fluid (F) and then into the tissue of the limb (L), a change in acoustic impedance may occur due to reflection. If the fluid (F) has a different acoustic impedance as compared with the tissue, an acoustic impedance mismatch may occur causing signal losses or distortion. Accordingly, the control system (CS) seeks to adjust the acoustic impedance of the fluid (F) such that it matches the acoustic impedance of the tissue of the limb (L). In one example, the matched acoustic impedance values range are in the range of 1.1 to 5.3 MRayl. The control system (CS) can store, in memory, a look up table of fluid temperature/density and impedance values for the fluid (F) and limb (L). The control system (CS) can raise/lower the temperature according to the look up table, using hysteresis, or any type of control algorithm until the fluid (F) acoustic impedance matches the limb (L) acoustic impedance. The user interface (UI) can be controlled to provide values or alerts related to impedance matches or mismatches or to enable the user to trigger an impedance matching control protocol to initiate heating of the fluid (F).

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An ultrasound scanning system adapted for scanning a joint of a limb, the ultrasound scanning system comprising:
 a reservoir comprising one or more walls that define a reservoir interior, the reservoir being configured to hold a fluid and receive the limb within the reservoir interior, wherein the reservoir has a proximal reservoir opening and a distal closure, wherein the reservoir is oriented vertically such that the distal closure is located at a bottom of the reservoir, the proximal reservoir opening being located above the distal closure such that the distal closure supports a weight of the fluid within the reservoir interior, and the reservoir enables the limb to pass through the proximal reservoir opening to enter the reservoir interior and to extend beyond the distal closure, and wherein the distal closure is configured to fit around the limb to create a seal between the limb and the distal closure;
a transducer disposed within the reservoir interior and comprising an array of ultrasound emitters and an array of ultrasound receivers, the transducer being configured to surround the joint within the reservoir interior; and
a transducer positioning system disposed outside of the reservoir and comprising an actuator configured to move a transducer carriage along a guide, the transducer carriage is configured to couple to the transducer across the one or more walls of the reservoir using non-contact coupling, and the transducer positioning system is configured to move the transducer carriage along the guide to move the transducer within the reservoir interior.

2. The ultrasound scanning system of claim 1, wherein a reservoir axis is defined between the proximal reservoir opening and the distal closure, and the guide along which the transducer carriage moves is a linear guide oriented parallel to the reservoir axis and the linear guide extends between the proximal reservoir opening and the distal closure.

3. The ultrasound scanning system of claim 1, comprising a reservoir positioning system comprising an actuator configured to move a reservoir carriage along a guide, the reservoir carriage being coupled to the reservoir, and the reservoir positioning system being configured to move the reservoir carriage along the guide to adjust a position of the reservoir.

4. The ultrasound scanning system of claim 2, wherein:
the one or more walls of the reservoir comprise a flexible material and the reservoir is configured to be moved to, and between, a collapsed state wherein the proximal reservoir opening is spaced apart from the distal closure by a first distance, and an extended state wherein the proximal reservoir opening is spaced apart from the distal closure by a second distance that is greater than the first distance; and
the reservoir positioning system is configured to move the reservoir carriage along the guide to move the reservoir at, and between, the collapsed state and the extended state.

5. The ultrasound scanning system of claim 1, wherein the distal closure comprises an exterior flange that extends outside of the reservoir, and the guide of the transducer positioning system is supported by the exterior flange of the distal closure.

6. The ultrasound scanning system of claim 1, wherein the one or more walls of the reservoir are rigid, and the guide of the transducer positioning system is supported by an exterior surface of one or more walls of the reservoir.

7. The ultrasound scanning system of claim 1, comprising a base that is supportable by a floor surface, and wherein the guide of the transducer positioning system is supported by the base.

8. The ultrasound scanning system of claim 1, wherein the reservoir has a cylindrical configuration and the transducer is ring-shaped.

9. The ultrasound scanning system of claim 1, wherein the non-contact coupling is further defined as magnetic coupling and wherein the transducer carriage is configured to couple to the transducer across the one or more walls of the reservoir using magnetic coupling.

10. The ultrasound scanning system of claim 1, wherein the actuator is a first actuator;
wherein the transducer carriage is a first transducer carriage;
wherein the linear guide is a first linear guide;
wherein the first linear guide and first transducer carriage are located on one side of the transducer; and
wherein the transducer positioning system further comprises:
a second actuator configured to move a second transducer carriage along a second linear guide, the second transducer carriage is configured to magnetically couple to the transducer across one or more walls of the reservoir, and the second linear guide and second transducer carriage are located on an opposing side of the transducer; and
a control system configured to control the first and second actuators to simultaneously move the first and second transducer carriages along the first and second linear guides to move the transducer within the reservoir interior.

11. An ultrasound scanning system adapted for scanning a joint of a limb, the ultrasound scanning system comprising:
a reservoir defining a reservoir interior and being configured to hold a fluid and receive the limb within the reservoir interior; and
a transducer disposed within the reservoir interior and comprising an array of ultrasound emitters and an array of ultrasound receivers, the transducer configured to surround the joint within the reservoir interior; and
wherein the reservoir comprises one or more walls extending between a proximal reservoir opening and a distal closure, wherein the reservoir enables the limb to pass through the proximal reservoir opening and to extend beyond the distal closure, and wherein the distal closure is configured to fit around the limb to create a seal between the limb and the distal closure to prevent leakage of the fluid; and
wherein the reservoir is oriented vertically such that the distal closure is located at a bottom of the reservoir, the proximal reservoir opening being located above the distal closure such that the distal closure supports a weight of the fluid within the reservoir interior.

12. The ultrasound scanning system of claim 11, wherein the reservoir comprises a distal reservoir opening opposite the proximal reservoir opening, and wherein the distal closure is configured to attach to the reservoir at the distal reservoir opening.

13. The ultrasound scanning system of claim 12, wherein the distal closure comprises an end plate configured to attach to the reservoir at the distal reservoir opening, the end plate comprising:
an interior flange that is configured to couple to the distal reservoir opening;
an exterior flange that is configured to extend outside of the reservoir; and
end plate opening configured to enable the limb to pass therethrough.

14. The ultrasound scanning system of claim 13, wherein the distal closure comprises a limb seal configured to be disposed within the reservoir interior, the limb seal comprising:

a seal support that defines a seal support opening configured to enable the limb to pass therethrough; and an elastic material coupled to the seal support and extending across the seal support opening, the elastic material comprising an aperture configured to enable the limb to pass therethrough, and the elastic material configured to fit around the limb to create a seal between the limb and the elastic material.

15. The ultrasound scanning system of claim 14, wherein the interior flange of the end plate is configured to support the seal support when the limb seal is disposed within the reservoir interior.

16. The ultrasound scanning system of claim 14, wherein the interior flange of the end plate defines a groove that is sized to receive the seal support therein.

17. The ultrasound scanning system of claim 14, wherein the seal support is configured to magnetically couple to the interior flange of the end plate.

18. The ultrasound scanning system of claim 14, wherein each of the end plate and the seal support are ring-shaped.

19. The ultrasound scanning system of claim 13, comprising a transducer positioning system comprising an actuator configured to move a transducer carriage along a guide, the transducer carriage is configured to couple to the transducer, and the transducer positioning system is configured to move the transducer carriage along the guide to move the transducer within the reservoir interior.

20. The ultrasound scanning system of claim 19, wherein the guide is coupled to and supported by the exterior flange of the end plate.

21. The ultrasound scanning system of claim 11, comprising a reservoir positioning system comprising an actuator configured to move a reservoir carriage along a guide, the reservoir carriage being coupled to the reservoir, and the reservoir positioning system being configured to move the reservoir carriage along the guide to adjust a position of the reservoir.

22. The ultrasound scanning system of claim 11, wherein the reservoir has a body that is rigid and has cylindrical configuration, and wherein the transducer is ring-shaped.

23. An ultrasound scanning system adapted for scanning a joint of a limb, the ultrasound scanning system comprising:

a reservoir defining a reservoir interior and being configured to hold a fluid and receive the limb within the reservoir interior, wherein the reservoir comprises one or more walls extending between a proximal reservoir opening and a distal closure, wherein the reservoir enables the limb to pass through the proximal reservoir opening and to extend beyond the distal closure, and wherein the distal closure is configured to fit around the limb to create a seal between the limb and the distal closure to prevent leakage of the fluid, the reservoir being oriented vertically such that the distal closure is located at a bottom of the reservoir, the proximal reservoir opening being located above the distal closure such that the distal closure supports a weight of the fluid within the reservoir interior;

a transducer comprising an array of ultrasound emitters and an array of ultrasound receivers, the transducer configured to surround the joint; and a transducer positioning system comprising an actuator configured to move a transducer carriage along a guide, the transducer carriage is configured to couple to the transducer, and the transducer positioning system is configured to move the transducer carriage along the guide to move the transducer relative to the joint.

* * * * *